United States Patent
Yu et al.

(10) Patent No.: US 10,425,213 B2
(45) Date of Patent: Sep. 24, 2019

(54) INFORMATION TRANSMISSION METHOD, USER EQUIPMENT, AND BASE STATION

(71) Applicant: Huawei Technologies Co., Ltd., Shenzhen (CN)

(72) Inventors: Zheng Yu, Beijing (CN); Fang Nan, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 115 days.

(21) Appl. No.: 15/588,443

(22) Filed: May 5, 2017

(65) Prior Publication Data
US 2017/0244537 A1    Aug. 24, 2017

Related U.S. Application Data

(63) Continuation of application No. PCT/CN2014/090629, filed on Nov. 7, 2014, now abandoned.

(51) Int. Cl.
*H04L 5/00* (2006.01)
*H04W 72/12* (2009.01)
(Continued)

(52) U.S. Cl.
CPC .......... *H04L 5/0094* (2013.01); *H04L 5/0007* (2013.01); *H04L 5/0044* (2013.01);
(Continued)

(58) Field of Classification Search
CPC ... H04L 5/0007; H04L 5/0044; H04L 5/0051; H04L 5/0053; H04L 5/0094
See application file for complete search history.

(56) References Cited

U.S. PATENT DOCUMENTS

2011/0116428 A1* 5/2011 Seong .................. H04L 1/0038
370/311
2013/0083753 A1* 4/2013 Lee .................. H04W 74/0833
370/329
(Continued)

FOREIGN PATENT DOCUMENTS

CN          101873206 A     10/2010
CN          102655676 A      9/2012
(Continued)

OTHER PUBLICATIONS

"PDSCH Scheduling for Low Cost MTC UE"; 3GPP TSG-RAN WG1 Meeting #76bis; Shenzen, China, Mar. 31-Apr. 4, 2014; R1-141525 (Year: 2014).*
(Continued)

*Primary Examiner* — Gary Mui
(74) *Attorney, Agent, or Firm* — Leydig, Voit & Mayer, Ltd.

(57) ABSTRACT

An information transmission method, user equipment, and a base station are provided. The method may include: obtaining, by user equipment, first subframe configuration information used to instruct to receive information on a first subband resource; determining, by the user equipment according to the first subframe configuration information, a first subframe for receiving the information on the first subband resource; and receiving, by the user equipment, the information only on the first subband resource in the first subframe.

15 Claims, 6 Drawing Sheets

(51) Int. Cl.
*H04W 88/02* (2009.01)
*H04W 88/08* (2009.01)

(52) U.S. Cl.
CPC .......... *H04L 5/0051* (2013.01); *H04L 5/0053* (2013.01); *H04W 72/1242* (2013.01); *H04W 88/02* (2013.01); *H04W 88/08* (2013.01)

(56) References Cited

U.S. PATENT DOCUMENTS

| | | | | |
|---|---|---|---|---|
| 2013/0183987 | A1* | 7/2013 | Vrzic | H04L 5/0053 455/450 |
| 2013/0201936 | A1 | 8/2013 | Chen et al. | |
| 2013/0343336 | A1 | 12/2013 | Bai | |
| 2015/0009937 | A1 | 1/2015 | Li | |
| 2015/0110055 | A1 | 4/2015 | Lv et al. | |
| 2016/0150462 | A1* | 5/2016 | Yang | H04W 4/70 370/254 |
| 2017/0079064 | A1* | 3/2017 | Yang | H04W 72/042 |
| 2017/0279646 | A1* | 9/2017 | Yi | H04L 5/0053 |

FOREIGN PATENT DOCUMENTS

| | | |
|---|---|---|
| CN | 102891714 A | 1/2013 |
| CN | 103312483 A | 9/2013 |
| CN | 104125040 A | 10/2014 |
| EP | 2906004 A1 | 8/2015 |
| JP | 2015502698 A | 1/2015 |
| WO | 2013067475 A1 | 5/2013 |
| WO | 2014067048 A1 | 5/2014 |

OTHER PUBLICATIONS

"$3^{rd}$ Generation Partnership Project; Technical Specification Group Radio Access Network; Evolved Universal Terrestrial Radio Access (E-UTRA); Physical channels and modulation (Release 12)," 3GPP TS 36.211, V12.3.0, pp. 1-124, $3^{rd}$ Generation Partnership Project, Valbonne, France (Sep. 2014).

"$3^{rd}$ Generation Partnership Project; Technical Specification Group Radio Access Network; Evolved Universal Terrestrial Radio Access (E-UTRA); Multiplexing and channel coding (Release 12)," 3GPP TS 36.212, V12.2.0, pp. 1-89, $3^{rd}$ Generation Partnership Project, Valbonne, France (Sep. 2014).

"$3^{rd}$ Generation Partnership Project; Technical Specification Group Radio Access Network; Evolved Universal Terrestrial Radio Access (E-UTRA); Physical layer procedures (Release 12)," 3GPP TS 36.213, V12.3.0, pp. 1-212, $3^{rd}$ Generation Partnership Project, Valbonne, France (Sep. 2014).

"$3^{rd}$ Generation Partnership Project; Technical Specification Group Radio Access Network; Evolved Universal Terrestrial Radio Access (E-UTRA); Medium Access Control (MAC) protocol specification (Release 12)," 3GPP TS 36.321, V12.3.0, pp. 1-57, $3^{rd}$ Generation Partnership Project, Valbonne, France (Sep. 2014).

"$3^{rd}$ Generation Partnership Project; Technical Specification Group Radio Access Network; Evolved Universal Terrestrial Radio Access (E-UTRA); Radio Resource Control (RRC); Protocol specification (Release 12)," 3GPP TS 36.331, V12.3.0, pp. 1-378, $3^{rd}$ Generation Partnership Project, Valbonne, France (Sep. 2014).

"Initial Views on UE Complexity Reduction in Rel-13 Low Cost MTC," 3GPP TSG RAN WG1 Meeting #78bis, Ljublijana, Slovenia, R1-144146, XP50869792A, 3rd Generation Partnership Project, Valbonne, France (Oct. 6-10, 2014).

"UE-Common Signaling for MTC UEs," 3GPP TSG RAN WG1 #78bis, Ljubljana, Slovenia, R1-143875, pp. 1-2, 3rd Generation Partnership Project—Valbonne, France (Oct. 6-10, 2014).

"Considerations on common control messages for MTC enhancement," 3GPP TSG RAN WG1 Meeting #78bis, R1-143809, Ljubljana, Slovenia, pp. 1-4, 3rd Generation Partnership Project—Valbonne, France (Oct. 6-10, 2014).

\* cited by examiner

A base station determines, according to a common identifier between the base station and user equipment, a first subframe in which the user equipment receives information on a first subband resource  — 601

The base station sends the information to the user equipment only on the first subband resource in the first subframe  — 602

INFORMATION TRANSMISSION METHOD, USER EQUIPMENT, AND BASE STATION

CROSS-REFERENCE TO RELATED APPLICATIONS

This application is a continuation of International Application No. PCT/CN2014/090629, filed on Nov. 7, 2014, which is hereby incorporated by reference in its entirety.

TECHNICAL FIELD

Embodiments of the present invention relate to the communications field, and in particular, to an information transmission method, user equipment, and a base station.

BACKGROUND

For low-complexity or low-cost user equipment, a bandwidth that is used for receiving/sending a signal and can be supported by the user equipment is less than a maximum carrier bandwidth specified in a system or a particular carrier bandwidth. For example, in an existing long term evolution (LTE) communications system, six system bandwidths: 1.4 megahertz (MHz), 3 MHz, 5 MHz, 10 MHz, 15 MHz, and 20 MHz are specified. However, the bandwidth supported by the low-complexity or low-cost user equipment is less than 20 MHz. For example, a signal (radio frequency and/or baseband) bandwidth that can be supported by the low-complexity or low-cost user equipment is 1.4 MHz or N (N is a positive integer, for example, N=6) physical resource blocks (PRB). For convenience, a frequency resource that can be supported or processed by the low-complexity or low-cost user equipment may be referred to as a subband (in the present invention, the subband may be a narrowband). The subband refers to a frequency resource that occupies a particular frequency width on a carrier. The subband may be composed of one or more PRBs, or may be composed of one or more subcarriers. A frequency resource width and a frequency resource location of the subband are predetermined or preconfigured.

When a service is provided for the low-complexity or low-cost user equipment, the low-complexity or low-cost user equipment may receive information on multiple different subband resources. For example, multiple subband resources are configured on a carrier for the low-complexity or low-cost user equipment. System information is transmitted on a subband resource 1, and proprietary data of the user equipment is transmitted on a subband resource 2. Therefore, the user equipment may need to receive the information on the subband resource 1 and on the subband resource 2.

At a same moment, low-complexity or low-cost user equipment can receive or send information only on one subband resource because of capability limitation. The subband resource herein may be one subband resource in multiple subband resources. The information includes control information and data information scheduled by using the control information. The control information may be classified into common control information and unicast control information. The data information is classified into common data information and unicast data information according to different control information for controlling scheduling of the data information. On a control channel, if a subband resource occupied for transmitting the common control information is different from a subband resource occupied for transmitting the unicast control information, the low-complexity or low-cost user equipment cannot simultaneously receive the common control information and the unicast control information, but can choose to receive only the common control information or the unicast control information.

In the prior art, before receiving control information, user equipment needs to perform blind detection on a control channel. To reduce complexity of performing blind detection on the control channel by the user equipment, user-equipment-specific unicast control information is transmitted in a first subframe, and common control information is transmitted in a second subframe. The first subframe and the second subframe do not overlap in time. Because the common control information and the user-specific unicast control information are not transmitted in a same subframe, the user equipment does not need to simultaneously receive the common control information and the user-specific unicast control information.

The foregoing method can only ensure that common control information and unicast control information are not simultaneously transmitted, and user equipment does not need to simultaneously receive the common control information and the user-specific unicast control information. However, when data information scheduled by using control information and the control information are not transmitted in a subframe, the user-specific unicast data information and the common control information may be simultaneously transmitted, common data information and the user-specific unicast control information may be simultaneously transmitted, or the unicast data information and the common data information may be simultaneously transmitted. When the simultaneous transmission occurs, a problem about how to enable low-complexity or low-cost user equipment to receive information cannot be resolved in the prior art described above.

In addition, according to the method in the prior art, all user-equipment-specific unicast control information cannot be transmitted in a subframe the same as that in which common control information is transmitted. This greatly limits using of system resources. For example, in a coverage enhancement scenario, control information needs to be repeatedly transmitted multiple times to enhance transmission reliability. According to the method in the prior art, common control information or user-specific unicast control information can be transmitted only in a particular subframe set. As a result, a transmission resource cannot be fully used, a time consumed to transmit the control information is prolonged, and power consumption of detecting a control channel by user equipment is increased.

SUMMARY

Embodiments of the present invention provide an information transmission method, user equipment, and a base station, are applicable to a scenario in which low-complexity or low-cost user equipment receives information, and can avoid a waste of system resources.

According to a first aspect, an embodiment of the present invention provides an information transmission method, including:

obtaining, by user equipment, first subframe configuration information used to instruct to receive information on a first subband resource;

determining, by the user equipment according to the first subframe configuration information, a first subframe for receiving the information on the first subband resource; and receiving, by the user equipment, the information only on the first subband resource in the first subframe.

With reference to the first aspect, in a first possible implementation manner of the first aspect, the information includes at least unicast information, where the unicast information includes unicast control information and/or unicast data information; or the information includes at least common information, where the common information includes common control information and/or common data information.

With reference to the first aspect, in a second possible implementation manner of the first aspect, the information includes unicast information and the information does not include common information, where the unicast information includes unicast control information and/or unicast data information, and the common information includes common control information and/or common data information.

With reference to the first aspect, in a third possible implementation manner of the first aspect, the information includes common information and the information does not include unicast information, where the common information includes common control information and/or common data information, and the unicast information includes unicast control information and/or unicast data information.

With reference to the first aspect or the first, the second, or the third possible implementation manner of the first aspect, in a fourth possible implementation manner of the first aspect, the determining, by the user equipment according to the first subframe configuration information, a first subframe for receiving the information on the first subband resource includes:

obtaining, by the user equipment, a first subframe configuration index from the first subframe configuration information;

determining, by the user equipment according to a preset correspondence, first subframe configuration corresponding to the first subframe configuration index; and determining, by the user equipment according to the first subframe configuration, the first subframe for receiving the information on the first subband resource.

With reference to the first aspect or the first, the second, the third, or the fourth possible implementation manner of the first aspect, in a fifth possible implementation manner of the first aspect, the first subframe configuration information includes one or more of the following content:

a subframe for the unicast information, a start subframe for the unicast information, a subframe period for the unicast information, a radio frame for the unicast information, a radio frame number for the unicast information, a radio frame period for the unicast information, a quantity of subframes occupied by the unicast information, a quantity of radio frames occupied by the unicast information, a quantity of symbols occupied by the unicast information, or a start symbol for the unicast information.

With reference to the first aspect, in a sixth possible implementation manner of the first aspect, the obtaining, by user equipment, first subframe configuration information used to instruct to receive information on a first subband resource includes:

obtaining, by the user equipment, the first subframe configuration information according to preconfiguration; or obtaining, by the user equipment, the first subframe configuration information by receiving one or more of radio resource control signaling, Media Access Control signaling, or physical layer signaling.

With reference to the first aspect or the first, the second, or the third possible implementation manner of the first aspect, in a seventh possible implementation manner of the first aspect, the method further includes:

obtaining, by the user equipment, second subframe configuration information used to instruct to receive common information on a second subband resource;

determining, by the user equipment according to the second subframe configuration information, a second subframe for receiving the common information on the second subband resource; and receiving, by the user equipment, the common information only on the second subband resource in the second subframe.

With reference to the seventh possible implementation manner of the first aspect, in an eighth possible implementation manner of the first aspect, the determining, by the user equipment according to the second subframe configuration information, a second subframe for receiving the common information on the second subband resource includes:

obtaining, by the user equipment, a second subframe configuration index from the second subframe configuration information;

determining, by the user equipment according to a preset correspondence, second subframe configuration corresponding to the second subframe configuration index; and determining, by the user equipment according to the second subframe configuration, the second subframe for receiving the common information on the second subband resource.

With reference to the seventh or the eighth possible implementation manner of the first aspect, in a ninth possible implementation manner of the first aspect, the second subframe configuration information includes one or more of the following content:

a subframe for the common information, a start subframe for the common information, a subframe period for the common information, a radio frame for the common information, a radio frame number for the common information, a radio frame period for the common information, a quantity of subframes occupied by the common information, a quantity of radio frames occupied by the common information, a quantity of symbols occupied by the common information, or a start symbol for the common information.

With reference to the first or the second possible implementation manner of the first aspect, in a tenth possible implementation manner of the first aspect, the receiving, by the user equipment, the information only on the first subband resource in the first subframe includes:

receiving, by the user equipment, the unicast control information only on the first subband resource in the first subframe; and the method further includes:

determining, by the user equipment according to the unicast control information, a subframe for transmitting the unicast data information scheduled by using the unicast control information; and receiving, by the user equipment, the unicast data information in the determined subframe for transmitting the unicast data information.

With reference to the first or the third possible implementation manner of the first aspect, in an eleventh possible implementation manner of the first aspect, the receiving, by the user equipment, the information only on the first subband resource in the first subframe includes:

receiving, by the user equipment, the common control information only on the first subband resource in the first subframe; and the method further includes:

determining, by the user equipment according to the common control information, a subframe for transmitting the common data information scheduled by using the common control information; and receiving, by the user equipment, the common data information in the determined subframe for transmitting the common data information.

According to a second aspect, an embodiment of the present invention provides an information transmission method, including:

determining, by user equipment, an information priority; and according to the determined information priority, receiving, by the user equipment, first information with a highest priority in a first subframe, and skipping receiving second information in the first subframe, where a priority of the second information is lower than that of the first information.

With reference to the second aspect, in a first possible implementation manner of the second aspect, the determining, by user equipment, an information priority includes:

determining, by the user equipment, the information priority according to an information type; and/or determining, by the user equipment according to a subband resource occupied for information transmission, a priority of information transmitted on the subband resource.

According to a third aspect, an embodiment of the present invention provides an information transmission method, including:

determining, by a base station for user equipment, first subframe configuration information used to instruct to transmit information on a first subband resource;

determining, by the base station according to the first subframe configuration information, a first subframe in which the user equipment receives the information on the first subband resource; and sending, by the base station, the information to the user equipment on the first subband resource in the first subframe.

With reference to the third aspect, in a first possible implementation manner of the third aspect, the information includes at least unicast information, where the unicast information includes unicast control information and/or unicast data information; or the information includes at least common information, where the common information includes common control information and/or common data information.

With reference to the third aspect, in a second possible implementation manner of the third aspect, the information includes unicast information and the information does not include common information, where the unicast information includes unicast control information and/or unicast data information, and the common information includes common control information and/or common data information.

With reference to the third aspect, in a third possible implementation manner of the third aspect, the information includes common information and the information does not include unicast information, where the common information includes common control information and/or common data information, and the unicast information includes unicast control information and/or unicast data information.

With reference to the third aspect or the first, the second, or the third possible implementation manner of the third aspect, in a fourth possible implementation manner of the third aspect, the determining, by a base station for user equipment, first subframe configuration information used to instruct to transmit information on a first subband resource includes:

determining, by the base station, the first subframe for the user equipment, where the first subframe is a subframe in which the user equipment receives the information on the first subband resource;

determining, by the base station according to a preset correspondence, a first subframe configuration index corresponding to first subframe configuration; and generating, by the base station, the first subframe configuration information, where the first subframe configuration information includes the first subframe configuration index.

With reference to the third aspect, in a fifth possible implementation manner of the third aspect, the method further includes:

sending, by the base station, the first subframe configuration information to the user equipment by using one or more of radio resource control signaling, Media Access Control signaling, or physical layer signaling.

With reference to the third aspect, in a sixth possible implementation manner of the third aspect, the method further includes:

determining, by the base station for the user equipment, second subframe configuration information used to instruct to transmit common information on a second subband resource;

determining, by the base station according to the second subframe configuration information, a second subframe in which the user equipment receives the common information on the second subband resource; and sending, by the base station, the common information to the user equipment on the second subband resource in the second subframe.

With reference to the third aspect, in a seventh possible implementation manner of the third aspect, the determining, by the base station for the user equipment, second subframe configuration information used to instruct to transmit common information on a second subband resource includes:

determining, by the base station, the second subframe for the user equipment, where the second subframe is a subframe in which the user equipment receives the common information on the second subband resource;

determining, by the base station according to a preset correspondence, a second subframe configuration index corresponding to second subframe configuration; and generating, by the base station, the second subframe configuration information, where the second subframe configuration information includes the second subframe configuration index.

With reference to the third aspect, in an eighth possible implementation manner of the third aspect, the sending, by the base station, the information to the user equipment on the first subband resource in the first subframe includes:

determining, by the base station, an information priority; and according to the determined information priority, sending, by the base station, first information with a highest priority on the first subband resource in the first subframe, and skipping sending second information on the first subband resource in the first subframe, where a priority of the second information is lower than that of the first information.

With reference to the third aspect or the first or the second possible implementation manner of the third aspect, in a ninth possible implementation manner of the third aspect, the information is specifically the unicast information; and the sending, by the base station, the information to the user equipment on the first subband resource in the first subframe includes:

sending, by the base station, the unicast control information to the user equipment on the first subband resource in the first subframe; and continuing, by the base station, to send the unicast data information to the user equipment in a subframe that is used for transmitting the unicast data information and indicated by the unicast control information.

According to a fourth aspect, an embodiment of the present invention provides an information transmission method, including:

determining, by a base station according to a common identifier between the base station and user equipment, a first subframe in which the user equipment receives information on a first subband resource; and sending, by the base station, the information to the user equipment only on the first subband resource in the first subframe.

With reference to the fourth aspect, in a first possible implementation manner of the fourth aspect, the information includes unicast information and the information does not include common information; or the information includes common information and the information does not include unicast information; where the unicast information includes unicast control information and/or unicast data information, and the common information includes common control information and/or common data information.

With reference to the fourth aspect, in a second possible implementation manner of the fourth aspect, the method further includes:

determining, by the base station according to the common identifier between the base station and the user equipment, a second subframe in which the user equipment receives common information on a second subband resource; and sending, by the base station, the common information to the user equipment only on the second subband resource in the second subframe.

With reference to the fourth aspect, in a third possible implementation manner of the fourth aspect, wherein the information sent by the base station to the user equipment on the first subband resource in the first subframe includes unicast information, and the sent information does not include common information; or the information sent by the base station to the user equipment on the first subband resource in the first subframe includes common information, and the sent information does not include unicast information.

According to a fifth aspect, an embodiment of the present invention provides an information transmission method, including:

determining, by user equipment according to a common identifier between the user equipment and a base station, a first subframe in which the user equipment receives information on a first subband resource; and receiving, by the user equipment, the information only on the first subband resource in the first subframe.

With reference to the fifth aspect, in a first possible implementation manner of the fifth aspect, the information includes unicast information and the information does not include common information; or the information includes common information and the information does not include unicast information; where the unicast information includes unicast control information and/or unicast data information, and the common information includes common control information and/or common data information.

With reference to the fifth aspect, in a second possible implementation manner of the fifth aspect, the method further includes:

determining, by the user equipment according to the common identifier between the user equipment and the base station, a second subframe in which the user equipment receives common information on a second subband resource; and receiving, by the user equipment, the common information only on the second subband resource in the second subframe.

With reference to the fifth aspect, in a third possible implementation manner of the fifth aspect, wherein the information received by the user equipment on the first subband resource in the first subframe includes unicast information, and the received information does not include common information; or the information received by the user equipment on the second subband resource in the second subframe includes common information, and the received information does not include unicast information.

According to a sixth aspect, an embodiment of the present invention provides user equipment, including:

an obtaining module, configured to obtain first subframe configuration information used to instruct to receive information on a first subband resource;

a determining module, configured to determine, according to the first subframe configuration information, a first subframe for receiving the information on the first subband resource; and a receiving module, configured to receive the information only on the first subband resource in the first subframe.

With reference to the sixth aspect, in a first possible implementation manner of the sixth aspect, the information includes at least unicast information, where the unicast information includes unicast control information and/or unicast data information; or the information includes at least common information, where the common information includes common control information and/or common data information.

With reference to the sixth aspect, in a second possible implementation manner of the sixth aspect, the information includes unicast information and the information does not include common information, where the unicast information includes unicast control information and/or unicast data information, and the common information includes common control information and/or common data information.

With reference to the sixth aspect, in a third possible implementation manner of the sixth aspect, the information includes common information and the information does not include unicast information, where the common information includes common control information and/or common data information, and the unicast information includes unicast control information and/or unicast data information.

With reference to the sixth aspect or the first, the second, or the third possible implementation manner of the sixth aspect, in a fourth possible implementation manner of the sixth aspect, the determining module includes:

a first obtaining submodule, configured to obtain a first subframe configuration index from the first subframe configuration information;

a first determining submodule, configured to determine, according to a preset correspondence, first subframe configuration corresponding to the first subframe configuration index; and a second determining submodule, configured to determine, according to the first subframe configuration, the first subframe for receiving the information on the first subband resource.

With reference to the sixth aspect or the first, the second, the third, or the fourth possible implementation manner of the sixth aspect, in a fifth possible implementation manner of the sixth aspect, the first subframe configuration information includes one or more of the following content:

a subframe for the unicast information, a start subframe for the unicast information, a subframe period for the unicast information, a radio frame for the unicast information, a radio frame number for the unicast information, a radio frame period for the unicast information, a quantity of subframes occupied by the unicast information, a quantity of radio frames occupied by the unicast information, a quantity of symbols occupied by the unicast information, or a start symbol for the unicast information.

With reference to the sixth aspect, in a sixth possible implementation manner of the sixth aspect, the obtaining module is specifically configured to: obtain the first subframe configuration information according to preconfiguration; or obtain the first subframe configuration information by receiving one or more of radio resource control signaling, Media Access Control signaling, or physical layer signaling.

With reference to the sixth aspect or the first, the second, or the third possible implementation manner of the sixth aspect, in a seventh possible implementation manner of the sixth aspect, the obtaining module is further configured to obtain second subframe configuration information used to instruct to receive common information on a second subband resource;

the determining module is further configured to determine, according to the second subframe configuration information, a second subframe for receiving the common information on the second subband resource; and the receiving module is further configured to receive the common information only on the second subband resource in the second subframe.

With reference to the seventh possible implementation manner of the sixth aspect, in an eighth possible implementation manner of the sixth aspect, the determining module includes:

a second obtaining submodule, configured to obtain a second subframe configuration index from the second subframe configuration information;

a third determining submodule, configured to determine, according to a preset correspondence, second subframe configuration corresponding to the second subframe configuration index; and a fourth determining submodule, configured to determine, according to the second subframe configuration, the second subframe for receiving the common information on the second subband resource.

With reference to the seventh or the eighth possible implementation manner of the sixth aspect, in a ninth possible implementation manner of the sixth aspect, the second subframe configuration information includes one or more of the following content:

a subframe for the common information, a start subframe for the common information, a subframe period for the common information, a radio frame for the common information, a radio frame number for the common information, a radio frame period for the common information, a quantity of subframes occupied by the common information, a quantity of radio frames occupied by the common information, a quantity of symbols occupied by the common information, or a start symbol for the common information.

With reference to the first or the second possible implementation manner of the sixth aspect, in a tenth possible implementation manner of the sixth aspect, the receiving module is specifically configured to receive the unicast control information only on the first subband resource in the first subframe;

the determining module is further configured to determine, according to the unicast control information, a subframe for transmitting the unicast data information scheduled by using the unicast control information; and the receiving module is further configured to receive the unicast data information in the determined subframe for transmitting the unicast data information.

With reference to the first or the third possible implementation manner of the sixth aspect, in an eleventh possible implementation manner of the sixth aspect, the receiving module is specifically configured to receive the common control information only on the first subband resource in the first subframe;

the determining module is further configured to determine, according to the common control information, a subframe for transmitting the common data information scheduled by using the common control information; and the receiving module is further configured to receive the common data information in the determined subframe for transmitting the common data information.

According to a seventh aspect, an embodiment of the present invention further provides user equipment, including:

a determining module, configured to determine an information priority; and a receiving module, configured to: according to the determined information priority, receive first information with a highest priority in a first subframe, and skip receiving second information in the first subframe, where a priority of the second information is lower than that of the first information.

With reference to the seventh aspect, in a first possible implementation manner of the seventh aspect, the determining module is specifically configured to: determine the information priority according to an information type; and/or determine, according to a subband resource occupied for information transmission, a priority of information transmitted on the subband resource.

According to an eighth aspect, an embodiment of the present invention provides a base station, including:

a first determining module, configured to determine, for user equipment, first subframe configuration information used to instruct to transmit information on a first subband resource;

a second determining module, configured to determine, according to the first subframe configuration information, a first subframe in which the user equipment receives the information on the first subband resource; and a sending module, configured to send the information to the user equipment on the first subband resource in the first subframe.

With reference to the eighth aspect, in a first possible implementation manner of the eighth aspect, the information includes at least unicast information, where the unicast information includes unicast control information and/or unicast data information; or the information includes at least common information, where the common information includes common control information and/or common data information.

With reference to the eighth aspect, in a second possible implementation manner of the eighth aspect, the information includes unicast information and the information does not include common information, where the unicast information includes unicast control information and/or unicast data information, and the common information includes common control information and/or common data information.

With reference to the eighth aspect, in a third possible implementation manner of the eighth aspect, the information includes common information and the information does not include unicast information, where the common information includes common control information and/or common data information, and the unicast information includes unicast control information and/or unicast data information.

With reference to the eighth aspect or the first, the second, or the third possible implementation manner of the eighth aspect, in a fourth possible implementation manner of the eighth aspect, the first determining module is specifically configured to: determine the first subframe for the user equipment, where the first subframe is a subframe in which the user equipment receives the information on the first subband resource; determine, according to a preset correspondence, a first subframe configuration index corresponding to first subframe configuration; and generate the first subframe configuration information, where the first subframe configuration information includes the first subframe configuration index.

With reference to the eighth aspect, in a fifth possible implementation manner of the eighth aspect, the sending module is further configured to send the first subframe configuration information to the user equipment by using one or more of radio resource control signaling, Media Access Control signaling, or physical layer signaling.

With reference to the eighth aspect, in a sixth possible implementation manner of the eighth aspect, the first determining module is further configured to determine, for the user equipment, second subframe configuration information used to instruct to transmit common information on a second subband resource;

the second determining module is further configured to determine, according to the second subframe configuration information, a second subframe in which the user equipment receives the common information on the second subband resource; and the sending module is further configured to send the common information to the user equipment on the second subband resource in the second subframe.

With reference to the eighth aspect, in a seventh possible implementation manner of the eighth aspect, the first determining module is specifically configured to: determine the second subframe for the user equipment, where the second subframe is a subframe in which the user equipment receives the common information on the second subband resource; determine, according to a preset correspondence, a second subframe configuration index corresponding to second subframe configuration; and generate the second subframe configuration information, where the second subframe configuration information includes the second subframe configuration index.

With reference to the eighth aspect, in an eighth possible implementation manner of the eighth aspect, the sending module is specifically configured to: determine an information priority; and according to the determined information priority, send first information with a highest priority on the first subband resource in the first subframe, and skip sending second information on the first subband resource in the first subframe, where a priority of the second information is lower than that of the first information.

With reference to the eighth aspect or the first or the second possible implementation manner of the eighth aspect, in a ninth possible implementation manner of the eighth aspect, the information is specifically the unicast information; and the sending module is specifically configured to: send the unicast control information to the user equipment on the first subband resource in the first subframe; and continue to send the unicast data information to the user equipment in a subframe that is used for transmitting the unicast data information and indicated by the unicast control information.

According to a ninth aspect, an embodiment of the present invention provides a base station, including:

a determining module, configured to determine, according to a common identifier between the base station and user equipment, a first subframe in which the user equipment receives information on a first subband resource; and a sending module, configured to send the information to the user equipment only on the first subband resource in the first subframe.

With reference to the ninth aspect, in a first possible implementation manner of the ninth aspect, the information includes unicast information and the information does not include common information; or the information includes common information and the information does not include unicast information; where the unicast information includes unicast control information and/or unicast data information, and the common information includes common control information and/or common data information.

With reference to the ninth aspect, in a second possible implementation manner of the ninth aspect, the determining module is further configured to determine, according to the common identifier between the base station and the user equipment, a second subframe in which the user equipment receives common information on a second subband resource; and the sending module is further configured to send the common information to the user equipment only on the second subband resource in the second subframe.

With reference to the ninth aspect, in a third possible implementation manner of the ninth aspect, the information sent by the sending module to the user equipment on the first subband resource in the first subframe includes unicast information, and the sent information does not include common information; or the information sent by the sending module to the user equipment on the second subband resource in the second subframe includes common information, and the sent information does not include unicast information.

According to a tenth aspect, an embodiment of the present invention provides user equipment, including:

a determining module, configured to determine, according to a common identifier between the user equipment and a base station, a first subframe in which the user equipment receives information on a first subband resource; and a receiving module, configured to receive the information only on the first subband resource in the first subframe.

With reference to the tenth aspect, in a first possible implementation manner of the tenth aspect, the information includes unicast information and the information does not include common information; or the information includes common information and the information does not include unicast information; where the unicast information includes unicast control information and/or unicast data information, and the common information includes common control information and/or common data information.

With reference to the tenth aspect, in a second possible implementation manner of the tenth aspect, the determining module is further configured to determine, according to the common identifier between the user equipment and the base station, a second subframe in which the user equipment receives common information on a second subband resource; and the receiving module is further configured to receive the common information only on the second subband resource in the second subframe.

With reference to the tenth aspect, in a third possible implementation manner of the tenth aspect, the information received by the receiving module on the first subband resource in the first subframe includes unicast information, and the received information does not include common information; or the information received by the sending module on the second subband resource in the second subframe includes common information, and the received information does not include unicast information.

It can be learned from the foregoing technical solutions that the embodiments of the present invention have the following advantages:

In the embodiments of the present invention, user equipment first obtains first subframe configuration information used to instruct to receive information on a first subband resource. Then, the user equipment determines, according to the first subframe configuration information, a first subframe for receiving the information on the first subband resource. The user equipment receives the information only on the first subband resource in the first subframe. The user equipment may determine, according to the first subframe configuration information, the first subframe that may be used for receiving the information, and may determine the first subband resource needed for receiving the information. The user equipment may receive the information only on the first subband resource in the first subframe. A problem that low-complexity or low-cost user equipment cannot simultaneously receive two types of information is resolved, and a base station does not need to be prevented from simultaneously transmitting the two types of information in a same subframe. Therefore, a waste of system resources can be avoided.

DESCRIPTION OF EMBODIMENTS

Figure 1:
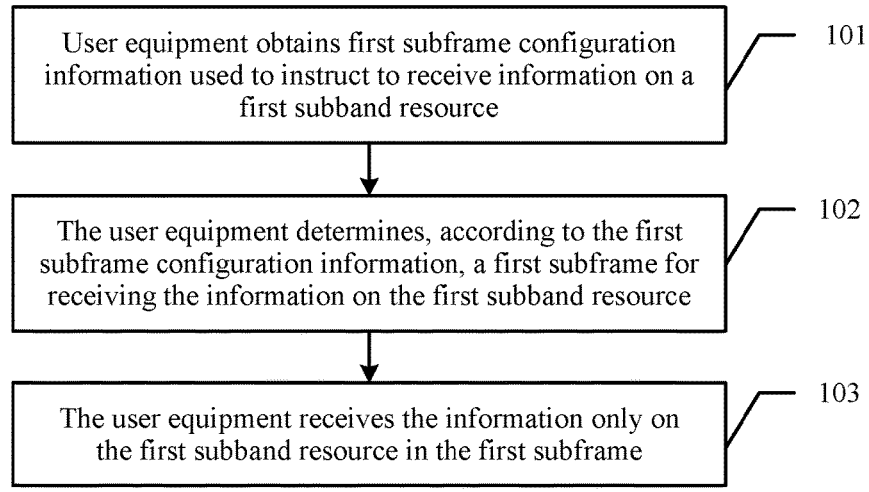
FIG. 1 is a schematic block diagram of a procedure of an information transmission method according to an embodiment of the present invention.

Embodiments of the present invention provide an information transmission method, user equipment, and a base station, are applicable to a scenario in which low-complexity or low-cost user equipment receives information, and can avoid a waste of system resources. Although implementation methods of the present invention are illustrated in the present invention by using user equipment and a base station as communication parties, the implementation methods of the present invention are also applicable to a case in which user equipment and user equipment are used as communication parties. In this case, one of the user equipments may be used as a base station.

Transmission in the present invention may be sending or may be receiving.

To make the invention objectives, features, and advantages of the present invention clearer and more comprehensible, the following clearly and completely describes the technical solutions in the embodiments of the present invention with reference to the accompanying drawings in the embodiments of the present invention. Apparently, the embodiments described in the following are merely some rather than all of the embodiments of the present invention. All other embodiments obtained by persons skilled in the art based on the embodiments of the present invention shall fall within the protection scope of the present invention.

In the present invention, UE may know a system bandwidth of a carrier, and determine one or more subband resources on the system bandwidth. Alternatively, the UE may not know a carrier (or may not know a system bandwidth of a carrier). In this case, the UE determines one or more subband resources according to indication information.

In the present invention, the implementation methods in the embodiments of the present invention are illustrated by using an example in which the UE is low-complexity or low-cost UE.

Unicast information in the present invention is user-specific or user-group-specific information. The unicast information may be one or more of information scrambled by using a cell radio network temporary identifier C-RNTI (cell radio network temporary identifier), information scrambled by using a semi-persist scheduling cell radio network temporary identifier SPS-RNTI (semi-persist scheduling cell radio network temporary identifier), information scrambled by using a temporary radio network temporary identifier T-RNTI (temporary radio network temporary identifier), or information scrambled by using a transmit power control radio network temporary identifier TPC-RNTI (transmit power control radio network temporary identifier). For an information type, the unicast information includes unicast control information and/or unicast data information.

Common information in the present invention is cell-specific or user-group-specific information. For an information type, the common information includes common control information and/or common data information. Generally, the common data information includes one or more of system information, random access response information, or a paging message. The common control information includes one or more of control information for scheduling the system information, control information for scheduling the random access response information, or control information for scheduling the paging message.

The system information and/or the control information for scheduling the system information in the present invention may be same information for all UEs in a cell. For example, the system information and/or the control information for scheduling the system information may be information scrambled by using a system information radio network temporary identifier SI-RNTI (system information radio network temporary identifier).

The random access response information and/or the control information for scheduling the random access response information in the present invention may be information scrambled by using a random access radio network temporary identifier RA-RNTI (random access radio network temporary identifier).

The paging message and/or the control information for scheduling the paging message in the present invention may be information scrambled by using a paging radio network temporary identifier P-RNTI (paging radio network temporary identifier).

In the specification, claims, and foregoing accompanying drawings of the present invention, the terms "first", "second", and so on are intended to distinguish between similar objects but do not necessarily indicate a particular order or sequence. It should be understood that the terms used in such a way are interchangeable in proper circumstances, which is merely a discrimination manner that is used when objects having a same attribute are described in the embodiments of the present invention. In addition, the terms "include", "contain" and any other variants mean to cover the non-exclusive inclusion, so that a process, method, system, product, or device that includes a series of units is not necessarily limited to those units, but may include other units not expressly listed or inherent to such a process, method, system, product, or device.

Details are separately described in the following.

An embodiment of an information transmission method in the present invention may be applied to user equipment. Referring to an information transmission method shown in FIG. 1, the method may include the following steps.

101. The user equipment obtains first subframe configuration information used to instruct to receive information on a first subband resource.

In this embodiment of the present invention, when a base station serves the user equipment, there may be multiple subband resources, and the user equipment may receive information from multiple subbands. For example, when a base station serves low-complexity or low-cost user equipment on a carrier, there may be multiple subband resources. However, because the user equipment is low-complexity or low-cost user equipment, the user equipment cannot simultaneously receive multiple pieces of information from multiple subbands. In such an application scenario, a process in which the user equipment receives the information on the first subband resource is used as an example for description. The first subband resource may be one subband resource in the multiple subband resources. The user equipment in this embodiment of the present invention needs to first obtain the first subframe configuration information. The first subframe configuration information may be used to indicate subframe configuration of receiving the information on the first subband resource.

The information received by the user equipment in step 101 may be implemented in multiple manners. The following provides description by using examples. Specifically, in an implementation scenario provided in the present invention, the information includes at least unicast information, where the unicast information includes unicast control information and/or unicast data information. Alternatively, the information includes at least common information, where the common information includes common control information and/or common data information. That is, the information that needs to be received by the user equipment may be the unicast information, or may be the common information. Further, the unicast information includes at least one of the unicast control information or the unicast data information, and the common information includes at least one of the common control information or the common data information.

In another implementation scenario provided in the present invention, the information includes unicast information and the information does not include common information, where the unicast information includes unicast control information and/or unicast data information, and the common information includes common control information and/or common data information. In another implementation scenario provided in the present invention, the information includes common information and the information does not include unicast information, where the common information includes common control information and/or common data information, and the unicast information includes unicast control information and/or unicast data information. That is, the information received by the user equipment may refer to only the unicast information, or refer to only the common information.

For example, the common information refers to one or more of system information, a system information block, control information for scheduling system information, control information for scheduling a system information block, a random access response, control information for scheduling a random access response, a paging message, control information for scheduling a paging message, a group message, control information for scheduling a group message, a master information block, a cell-specific downlink control channel, or cell-specific downlink control information. The group message means that the message includes information for a group of user equipments. The cell-specific downlink control channel may be a downlink control channel in cell-specific or user-equipment-group-specific search space. The cell-specific downlink control information may be downlink control information in cell-specific or user-equipment-group-specific search space. The unicast information refers to one or more of user-specific information, user proprietary information, user dedicated information, control information for scheduling user-specific information, control information for scheduling user proprietary information, control information for scheduling user dedicated information, a user-specific downlink control channel, or user-specific downlink control information.

In this embodiment of the present invention, the first subframe configuration information may include one or more of the following content:

a subframe for the unicast information, a start subframe for the unicast information, a subframe period for the unicast information, a radio frame for the unicast information, a radio frame number for the unicast information, a radio frame period for the unicast information, a quantity of subframes occupied by the unicast information, a quantity of radio frames occupied by the unicast information, a quantity of symbols occupied by the unicast information, or a start symbol for the unicast information.

For example, in one case, the first subframe configuration information may include the subframe for the unicast information, that is, the first subframe configuration information indicates one or more subframes in which the user equipment may receive the unicast information. In another case, the first subframe configuration information includes the start subframe for the unicast information, that is, a subframe from which the unicast information starts to be transmitted. In addition, the first subframe configuration information may include the radio frame number for the unicast information, that is, include one or more radio frames corresponding to one or more numbers. In addition, the first subframe configuration information may include two, three, or more of the foregoing content. For example, the first subframe configuration information may include the radio frame period for the unicast information and the quantity of radio frames occupied by the unicast information. As long as content can be used to determine a subframe used for receiving the information, the content can be included in the first subframe configuration information. Exhaustion is not performed herein.

In some embodiments of the present invention, the obtaining, by user equipment, first subframe configuration information used to instruct to receive information on a first subband resource in step 101 includes:

obtaining, by the user equipment, the first subframe configuration information according to preconfiguration; or obtaining, by the user equipment, the first subframe configuration information by receiving one or more of radio resource control signaling, Media Access Control signaling, or physical layer signaling.

The user equipment may determine, in multiple manners, first subframe configuration information for receiving the unicast information. For example, the user equipment may determine, according to prespecification, the first subframe configuration information for receiving the unicast information. The first subframe configuration information or a first subframe for receiving the unicast information is prespecified (or preset) in a system or standard. In this way, the user equipment may determine, according to the prespecification (or the presetting), the first subframe configuration information or the first subframe for receiving only the unicast information. For example, a subframe other than a subframe occupied for transmitting (one type or more types of) common information is prespecified in the system as the first subframe for receiving the unicast information. Optionally, the user equipment may obtain, by receiving the radio resource control signaling, the Media Access Control signaling, or the physical layer signaling, the first subframe configuration information for receiving the unicast information. The radio resource control signaling may be radio resource control common signaling and/or radio resource control dedicated signaling. The radio resource control common signaling may be one or more of system information, a system information block, or a master information block. For example, the first subframe configuration information for receiving the unicast information is carried in a system information block of type 1 or a system information block of type 2. For another example, the radio resource control dedicated signaling may be specifically one or more of an initial random access response or a contention resolution message. A random access response transmitted on a default subband resource (or a subband resource preset in the system) is referred to as an initial random access response. The Media Access Control signaling may be a Media Access Control control element. The physical layer signaling may be a control channel carrying control information. For example, the control channel is a control channel of control information for scheduling a random access response or a control channel of control information for scheduling a contention resolution message.

102. The user equipment determines, according to the first subframe configuration information, a first subframe for receiving the information on the first subband resource.

In this embodiment of the present invention, after the user equipment obtains the first subframe configuration information, the user equipment determines, by using the first subframe configuration information, the first subframe for receiving the information on the first subband resource. The first subframe is a subframe that is used for receiving the information on a first subband and that is determined by the user equipment. The first subframe determined by the user equipment by using the first subframe configuration information indicates a moment at which the user equipment receives the information on the first subband.

In some embodiments of the present invention, the determining, by the user equipment according to the first subframe configuration information, a first subframe for receiving the information on the first subband resource in step 102 specifically includes the following steps:

obtaining, by the user equipment, a first subframe configuration index from the first subframe configuration information;

determining, by the user equipment according to a preset correspondence, first subframe configuration corresponding to the first subframe configuration index; and determining, by the user equipment according to the first subframe configuration, the first subframe for receiving the information on the first subband resource.

Specifically, the first subframe configuration information may include one or more fields. Each field indicates one or more types of information in the first subframe configuration. Particularly, the first subframe configuration information includes only one field, and the field indicates the first subframe configuration index. Optionally, there is a predefined correspondence (such as a table relationship or a function relationship) between the first subframe configuration index and the first subframe configuration. The first subframe configuration is determined according to the first subframe configuration index, and the first subframe may be determined according to the first subframe configuration. In addition, it should be noted that in this embodiment of the present invention, a manner for determining the first subframe according to the first subframe configuration information by the user equipment is not limited to a manner of using the first subframe configuration index, and there may be another implementation means. For example, the first subframe may be determined according to the content carried in the first subframe configuration information. For example, according to the start subframe for receiving the unicast information and the quantity of subframes occupied for receiving the unicast information, the user equipment may calculate the first subframe by adding the start subframe and the quantity of subframes, where the start subframe and the quantity of subframes are carried in the first subframe configuration information.

103. The user equipment receives the information in the first subframe, only on the first subband resource.

In this embodiment of the present invention, after the user equipment determines, by performing step 102, the first subframe for receiving the information, the user equipment may receive the information only on the first subband resource in the determined first subframe. In this embodiment of the present invention, the receiving the information only on the first subband resource refers to receiving the information on the first subband resource and not receiving the information on another subband other than the first subband. For example, when multiple subband resources are configured in the system, the user equipment receives the information in the first subframe, only on the first subband resource. Even if the base station transmits information on another subband other than the first subband, the user equipment still receives only information that is on the first subband resource. For example, as described in the foregoing example, the information may include the unicast information and the information does not include the common information. In this case, specifically, in step 103, the user equipment needs to receive the unicast information in the first subframe, only on the first subband resource.

According to different implementation manners of the information, in some embodiments of the present invention, the receiving, by the user equipment, the information in the first subframe, only on the first subband resource in step 103 includes:

receiving, by the user equipment, the unicast control information in the first subframe, only on the first subband resource.

In this implementation scenario, the information transmission method provided in this embodiment of the present invention may further include the following steps:

determining, by the user equipment according to the unicast control information, a subframe and/or subband resource for transmitting the unicast data information scheduled by using the unicast control information; and receiving, by the user equipment, the unicast data information in the determined subframe and/or subband resource for transmitting the unicast data information.

That is, when the information is specifically the unicast control information, step 103 may be specifically as follows: The user equipment may receive the unicast control information on the first subband resource in the first subframe. In this case, after the user equipment receives the unicast control information, the user equipment determines, according to the unicast control information, the subframe and/or subband resource for transmitting the unicast data information scheduled by using the unicast control information. Next, the user equipment may receive the unicast data information in the determined subframe and/or subband resource for transmitting the unicast data information. That is, after receiving the unicast control information, the user equipment finds, by parsing the unicast control information, one or more subframes (and/or subband resources) in which the unicast data information scheduled by using the unicast control information is transmitted. The user equipment may receive, according to an indication of the unicast control information, the unicast data information associated with the unicast control information. If the unicast control information does not notify the user equipment of a subband resource for the unicast data information scheduled by using the unicast control information, the user equipment considers, by default, that the subband resource for receiving the unicast data information is the same as the subband resource for receiving the unicast control information. In addition, in the present invention, that the user equipment receives the information on the subband resource refers to receiving the information on some or all resources in the subband resource. Similarly, that the base station sends the information on the subband resource refers to sending the information on some or all resources in the subband resource.

According to different implementation manners of the information, in some other embodiments of the present invention, the receiving, by the user equipment, the information in the first subframe, only on the first subband resource in step 103 includes:

receiving, by the user equipment, the common control information in the first subframe, only on the first subband resource.

In this implementation scenario, the information transmission method provided in this embodiment of the present invention may further include the following steps:

determining, by the user equipment according to the common control information, a subframe for transmitting the common data information scheduled by using the common control information; and receiving, by the user equipment, the common data information in the determined subframe for transmitting the common data information.

That is, when the information is specifically the common control information, step 103 may be specifically as follows: The user equipment may receive the common control information on the first subband resource in the first subframe. In this case, after the user equipment receives the common control information, the user equipment determines, according to the common control information, the subframe for transmitting the common data information scheduled by using the common control information. Next, the user equipment may receive the common data information in the determined subframe for transmitting the common data information. That is, after receiving the common control information, the user equipment finds, by parsing the common control information, one or more subframes in which the common data information scheduled by using the common control information is transmitted. In this case, the user equipment may receive, according to an indication of the common control information, the common data information associated with the common control information. If the common control information does not notify the user equipment of a subband resource for the common data information scheduled by using the common control information, the user equipment considers, by default, that the subband resource for receiving the common data information is the same as the subband resource for receiving the common control information. If the common control information notifies the user equipment of a subband resource for the common data information scheduled by using the common control information, the user equipment receives the common data information on the subband resource that is used for transmitting the common data information and that is notified by the common control information.

As described in the foregoing example, in a scenario in the present invention, the user-equipment-specific unicast control information and the common control information are allowed to be transmitted in a same subframe. One of problems resolved by the present invention is a problem about how the user equipment receives control information when the user-equipment-specific unicast control information and the common control information are transmitted in the same subframe. In addition, the present invention also resolves a problem about how to receive the unicast data information and the common data information.

The following provides detailed description. In this embodiment of the present invention, when the unicast information is a user-specific downlink control channel or user-specific downlink control information, the first subframe configuration information indicates a subframe for receiving the user-specific downlink control channel or the user-specific downlink control information. When the user equipment detects the user-specific downlink control channel or the user-specific downlink control information in the first subframe, a subframe used for transmitting unicast data information scheduled by using the user-specific downlink control channel or the user-specific downlink control information (a start subframe of subframes used for transmitting the unicast data information and/or a quantity of subframes used for transmitting the unicast data information) is determined. For example, a timing relationship between the start subframe used for transmitting the unicast data information and a subframe for the user-specific downlink control channel scheduling the unicast data information is prespecified or preset. For another example, a timing relationship between the start subframe used for transmitting the unicast data information and a subframe for the user-specific downlink control information is prespecified or preset. For example, the quantity of subframes used for or time duration occupied for transmitting the unicast data information is prespecified. Alternatively, the user-specific downlink control channel or the user-specific downlink control information notifies the user equipment of the quantity of subframes used for or time duration occupied for transmitting the unicast data information. The user equipment receives, in the determined subframe used for transmitting the unicast data information, the unicast data information on a subband resource on which the unicast data information is located.

In this embodiment of the present invention, when the common information is a cell-specific downlink control channel or cell-specific downlink control information, a first subframe configuration information indicates a subframe for receiving the cell-specific downlink control channel or the cell-specific downlink control information. When the user equipment detects the cell-specific downlink control channel or the cell-specific downlink control information in a first subframe, a subframe used for transmitting common data information scheduled by using the cell-specific downlink control channel or the cell-specific downlink control information (a start subframe of subframes used for transmitting the common data information and/or a quantity of subframes used for transmitting the common data information) is determined. For example, a timing relationship between the start subframe used for transmitting the common data information and a subframe for the cell-specific downlink control channel scheduling the common data information is prespecified or preset. For example, a timing relationship between the start subframe used for transmitting the common data information and a subframe for the cell-specific downlink control information is prespecified or preset. For example, the quantity of subframes used for or time duration occupied for transmitting the common data information is prespecified. Alternatively, the cell-specific downlink control channel or the cell-specific downlink control information notifies the user equipment of the quantity of subframes used for or time duration occupied for transmitting the common data information. The user equipment receives, in the determined subframe used for transmitting the common data information, the common data information on a subband resource on which the common data information is located.

Figure 2:
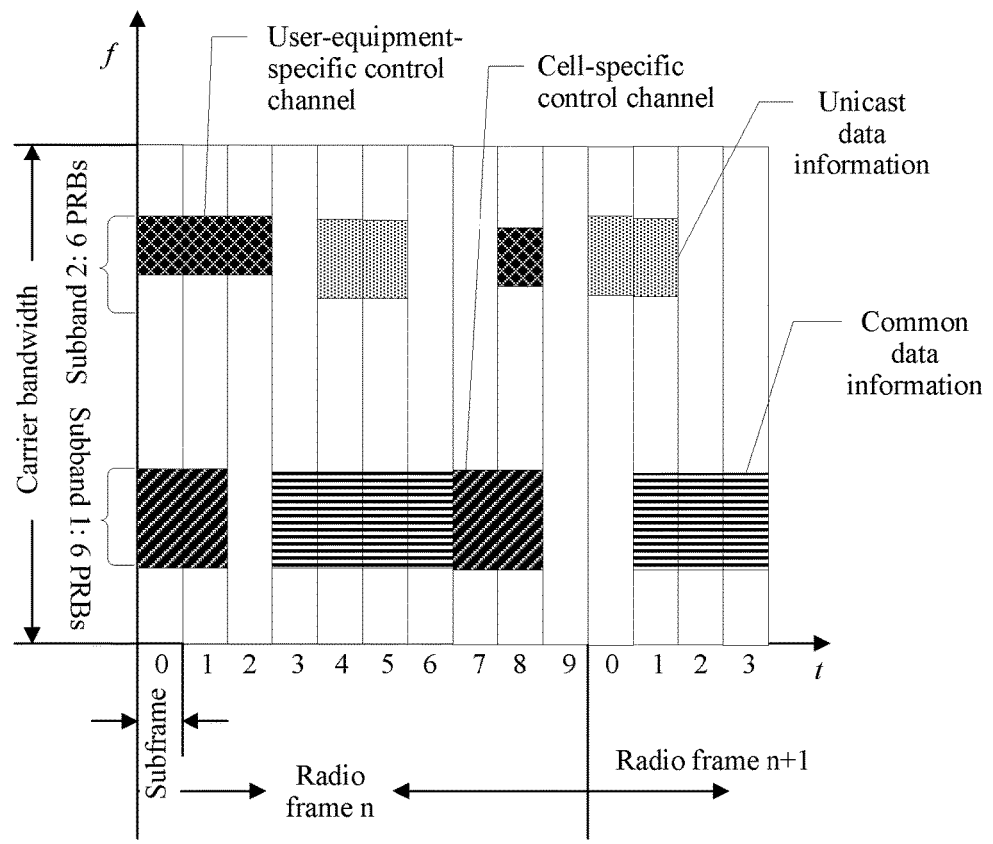
FIG. 2 is a schematic diagram of a manner of transmitting unicast information and common information according to an embodiment of the present invention.

The following provides a specific embodiment. As shown in FIG. 2, FIG. 2 is a schematic diagram of a manner of transmitting the unicast information and the common information according to this embodiment of the present invention. If the unicast information is a user-equipment-specific control channel, the first subframe configuration information indicates that subframes for transmitting the unicast information are a subframe 0, a subframe 1, and a subframe 2 in a radio frame n. That is, the subframe 0, the subframe 1, and the subframe 2 in the radio frame n are first subframes. The unicast information is transmitted on a subband 2. The unicast data information scheduled by using the unicast control information may be transmitted on the subband 2, or may be transmitted on another subband.

If the common information is a cell-specific control channel, the first subframe configuration information indicates that subframes for transmitting the common information are a subframe 7 and a subframe 8 in the radio frame n. That is, the subframe 7 and the subframe 8 are first subframes. The common information is transmitted on the subband 1. The common data information scheduled by using the common control information may be transmitted on the subband 1, or may be transmitted on another subband.

The base station sends the user-equipment-specific control channel in the subframe 0, the subframe 1, and the subframe 2. Although the base station also sends the cell-specific control channel in the subframe 0 and the subframe 1, the user equipment determines, according to the first subframe configuration information, to receive only information on a resource of the subband 2. Therefore, the user equipment receives the unicast information on the resource of the subband 2 in the subframe 0, the subframe 1, and the subframe 2. In addition, it is assumed that unicast data information scheduled by using the user-equipment-specific unicast control channel in the subframe 0, the subframe 1, and the subframe 2 is transmitted in a subframe 4 and a subframe 5 in the radio frame n. After the user equipment successfully detects the user-equipment-specific control channel, in the subframe 4 and the subframe 5 in the radio frame n, the user equipment receives the unicast data information on a subband for transmitting first data, and does not need to receive common data information on a resource of the subband 1.

The base station sends the cell-specific control channel in the subframe 7 and the subframe 8. Although the base station also sends the user-equipment-specific control channel in the subframe 8, the user equipment determines, according to the first subframe configuration information, to receive only information on the resource of the subband 1. Therefore, the user equipment receives the cell-specific control channel on the resource of the subband 1 in the subframe 7 and the subframe 8. In addition, it is assumed that common data information scheduled by using the cell-specific control channel in the subframe 7 and the subframe 8 is transmitted in a subframe 1, a subframe 2, and a subframe 3 in a radio frame n+1. After the user equipment successfully detects the cell-specific control channel, in the subframe 1, the subframe 2, and the subframe 3 in the radio frame n+1, the user equipment receives only the common data information on the subband for transmitting the common data information, and does not need to receive unicast data information.

In some embodiments of the present invention, in addition to the foregoing implementation steps, the information transmission method provided in this embodiment of the present invention may further include the following steps:

A1. The user equipment obtains second subframe configuration information used to instruct to receive common information on a second subband resource.

A2. The user equipment determines, according to the second subframe configuration information, a second subframe for receiving the common information on the second subband resource.

A3. The user equipment receives the common information in the second subframe, only on the second subband resource.

That is, in this embodiment of the present invention, in addition to step 101 to step 103, the user equipment further performs steps A1 to A3. In step A1, the second subframe configuration information indicates subframe configuration of receiving the common information on the second subband resource, and the second subband resource is a subband resource different from the first subband resource in frequency. After the user equipment obtains the second subframe configuration information, the user equipment determines the second subframe according to the second subframe configuration information. The user equipment receives the common information in the second subframe, only on the second subband resource.

With reference to the foregoing implementation manners of step 101 to step 103 and of step A1 to step A3, the following example is used for description. The user equipment may determine the first subframe configuration information instructing to receive the information on the first subband resource and determine the second subframe configuration information instructing to receive the common information on the second subband resource. Definition of the first subframe configuration information and how to determine the first subframe configuration information are described above. Definition of the second subframe configuration information and how to determine the second subframe configuration information are also described above. The user equipment determines, according to the first subframe configuration information, the first subframe for receiving the information on the first subband resource, and determines, according to the second subframe configuration information, the second subframe for receiving the common information on the second subband resource. The user equipment receives the unicast information only on the first subband resource in the determined first subframe, and receives the common information in the determined second subframe, only on the second subband resource.

In some embodiments of the present invention, the second subframe configuration information includes one or more of the following content:

a subframe for the common information, a start subframe for the common information, a subframe period for the common information, a radio frame for the common information, a radio frame number for the common information, a radio frame period for the common information, a quantity of subframes occupied by the common information, a quantity of radio frames occupied by the common information, a quantity of symbols occupied by the common information, or a start symbol for the common information.

An implementation manner of the second subframe configuration information is similar to that of the first subframe configuration information. A difference lies in that the second subframe configuration information instructs to receive the common information.

The determining, by the user equipment according to the second subframe configuration information, a second subframe for receiving the common information on the second subband resource in step A2 may specifically include the following steps:

obtaining, by the user equipment, a second subframe configuration index from the second subframe configuration information;

determining, by the user equipment according to a preset correspondence, second subframe configuration corresponding to the second subframe configuration index; and determining, by the user equipment according to the second subframe configuration, the second subframe for receiving the common information on the second subband resource.

Specifically, the second subframe configuration information may include one or more fields. Each field indicates one or more types of information in the second subframe configuration. Particularly, the second subframe configuration information includes only one field, and the field indicates the second subframe configuration index. Optionally, there is a predefined correspondence (such as a table relationship or a function relationship) between the second subframe configuration index and the second subframe configuration. The second subframe configuration is determined according to the second subframe configuration index, and the second subframe may be determined according to the second subframe configuration. In addition, it should be noted that in this embodiment of the present invention, a manner for determining the second subframe according to the second subframe configuration information by the user equipment is not limited to a manner of using the second subframe configuration index, and there may be another implementation means. For example, the second subframe may be determined according to the content carried in the second subframe configuration information. For example, according to the start subframe for receiving the common information and the quantity of subframes occupied for receiving the common information, the user equipment may calculate the second subframe by adding the start subframe and the quantity of subframes, where the start subframe and the quantity of subframes are carried in the second subframe configuration information.

It can be learned from the description of the present invention in the foregoing embodiment that user equipment first obtains first subframe configuration information used to instruct to receive information on a first subband resource. Then, the user equipment determines, according to the first subframe configuration information, a first subframe for receiving the information on the first subband resource. The user equipment receives the information only on the first subband resource in the first subframe. The user equipment may determine, according to the first subframe configuration information, the first subframe that may be used for receiving the information, and may determine the first subband resource needed for receiving the information. The user equipment may receive the information only on the first subband resource in the first subframe. A problem that low-complexity or low-cost user equipment cannot simultaneously receive two types of information is resolved, and a base station does not need to be prevented from simultaneously transmitting the two types of information in a same subframe. Therefore, a waste of system resources can be avoided.

Figure 3:
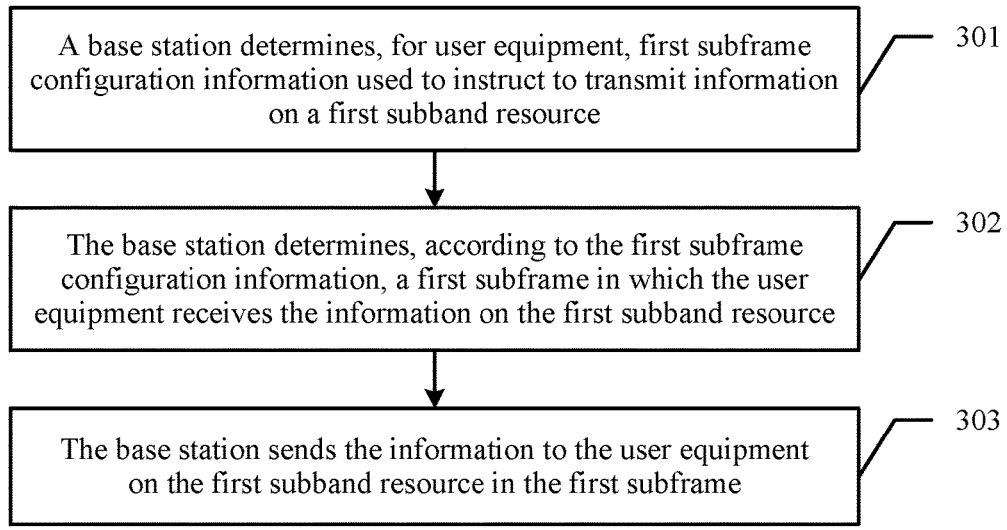
FIG. 3 is a schematic block diagram of a procedure of another information transmission method according to an embodiment of the present invention.

The foregoing embodiment describes, from a user equipment side, an information transmission method provided in an embodiment of the present invention. The following describes, from a base station side, an information transmission method provided in an embodiment of the present invention. As shown in FIG. 3, the method may specifically include the following steps.

301. A base station determines, for user equipment, first subframe configuration information used to instruct to transmit information on a first subband resource.

In this embodiment of the present invention, multiple subband resources may be configured by the base station, and the user equipment may receive information on the multiple subband resources. For example, multiple subband resources are configured on a carrier. However, low-complexity or low-cost user equipment cannot simultaneously receive multiple pieces of information from multiple subbands. In such an application scenario, a process in which the base station sends the information on the first subband resource is used as an example for description. The base station in this embodiment of the present invention first determines the first subframe configuration information for the user equipment. The first subframe configuration information may be used to indicate subframe configuration of receiving the information by the user equipment on the first subband resource.

In this embodiment of the present invention, the first subframe configuration information may include one or more of the following content:

a subframe for unicast information, a start subframe for unicast information, a subframe period for unicast information, a radio frame for unicast information, a radio frame number for unicast information, a radio frame period for unicast information, a quantity of subframes occupied by unicast information, a quantity of radio frames occupied by unicast information, a quantity of symbols occupied by unicast information, or a start symbol for unicast information.

In step 301, the base station may determine, for the user equipment in multiple implementation manners, the first subframe configuration information used to instruct to transmit the information on the first subband resource. The following provides description by using examples. Specifically, in an implementation scenario provided in the present invention, the information includes at least unicast information, where the unicast information includes unicast control information and/or unicast data information. Alternatively, the information includes at least common information, where the common information includes common control information and/or common data information. That is, the information that needs to be received by the user equipment may be the unicast information, or may be the common information. Further, the unicast information includes at least one of the unicast control information or the unicast data information, and the common information includes at least one of the common control information or the common data information.

In another implementation scenario provided in the present invention, the information includes unicast information and the information does not include common information, where the unicast information includes unicast control information and/or unicast data information, and the common information includes common control information and/or common data information. In another implementation scenario provided in the present invention, the information includes common information and the information does not include unicast information, where the common information includes common control information and/or common data information, and the unicast information includes unicast control information and/or unicast data information. That is, the information received by the user equipment may refer to only the unicast information, or refer to only the common information.

In some embodiments of the present invention, the determining, by a base station for user equipment, first subframe configuration information used to instruct to transmit information on a first subband resource in step 301 includes:

determining, by the base station, the first subframe for the user equipment, where the first subframe is a subframe in which the user equipment receives the information on the first subband resource;

determining, by the base station according to a preset correspondence, a first subframe configuration index corresponding to first subframe configuration; and generating, by the base station, the first subframe configuration information, where the first subframe configuration information includes the first subframe configuration index.

Specifically, first, the base station determines one or more subframes allocated to the user equipment for receiving the information on the first subband resource. The subframe determined by the base station is defined as the first subframe. Then, the base station determines the first subframe configuration index according to the correspondence, and finally adds the first subframe configuration index to the generated first subframe configuration information. The first subframe configuration information may include one or more fields. Each field indicates one or more types of information in the first subframe configuration. Particularly, the first subframe configuration information includes only one field, and the field indicates the first subframe configuration index. Optionally, there is a predefined correspondence (such as a table relationship or a function relationship) between the first subframe configuration index and the first subframe configuration. The first subframe configuration index is determined according to the first subframe configuration. In addition, it should be noted that in this embodiment of the present invention, a manner for adding by, the base station, the first subframe configuration index to the first subframe configuration information to generate the first subframe configuration information is not limited to a manner of using the first subframe configuration index, and there may be another implementation means. For example, the first subframe configuration information is generated according to the determined first subframe. For example, the base station determines the start subframe for sending the unicast information to the user equipment and the quantity of subframes occupied for sending the unicast information. The base station may determine the first subframe according to the start subframe for sending the unicast information and the quantity of subframes occupied for sending the unicast information. The base station may add, to the first subframe configuration information, information about the start subframe for sending the unicast information and information about the quantity of subframes occupied for sending the unicast information.

In this embodiment of the present invention, the information transmission method provided in the present invention may further include the following steps:

sending, by the base station, the first subframe configuration information to the user equipment by using one or more of radio resource control signaling, Media Access Control signaling, or physical layer signaling.

For example, the base station may determine, according to prespecification, first subframe configuration information for receiving the unicast information by the user equipment. The first subframe configuration information or the first subframe for receiving receives the unicast information by the user equipment is prespecified (or preset) in a system or standard. In this way, the base station may determine, according to the prespecification (or presetting), the first subframe configuration information or the first subframe for receiving the unicast information by the user equipment. For example, a subframe other than a subframe occupied for transmitting (one or more types of) common information is prespecified in the system as the first subframe in which the user equipment receives the unicast information. Optionally, the base station may autonomously determine, for the user equipment, the first subframe configuration information for receiving the unicast information by the user equipment. The base station adds, to the radio resource control signaling, the Media Access Control signaling, or the physical layer signaling, the first subframe configuration information for receiving the unicast information by the user equipment. The radio resource control signaling may be radio resource control common signaling and/or radio resource control dedicated signaling. The radio resource control common signaling may be one or more of system information, a system information block, or a master information block. For example, the first subframe configuration information for receiving the unicast information is carried in a system information block of type 1 or a system information block of type 2. For another example, the radio resource control dedicated signaling may be specifically one or more of an initial random access response or a contention resolution message. A random access response transmitted on a default subband resource (or a subband resource preset in the system) is referred to as an initial random access response. The Media Access Control signaling may be a Media Access Control control element. The physical layer signaling may be a control channel carrying control information. For example, the control channel is a control channel of control information for scheduling a random access response or a control channel of control information for scheduling a contention resolution message.

302. The base station determines, according to the first subframe configuration information, a first subframe in which the user equipment receives the information on the first subband resource.

In this embodiment of the present invention, after the base station determines the first subframe configuration information, the base station determines, by using the first subframe configuration information, the first subframe in which the user equipment receives the information on the first subband resource. The first subframe is determined by the base station from the determined first subframe configuration information. The base station determines, by using the first subframe determined from the first subframe configuration information, a moment at which the base station sends the information.

303. The base station sends the information to the user equipment on the first subband resource in the first subframe.

In this embodiment of the present invention, the base station may transmit the information on the first subband resource in the determined first subframe. In this embodiment of the present invention, the transmitting the information on the first subband resource refers to transmitting the information on some or all resources in the first subband resource. For example, when multiple subband resources are configured in the system, the base station transmits the information on the first subband resource in the first subframe, but the base station is not prevented from transmitting the information on another subband other than the first subband.

In some embodiments of the present invention, the information is specifically the unicast information. The sending, by the base station, the information to the user equipment on the first subband resource in the first subframe in step 303 includes:

sending, by the base station, the unicast control information to the user equipment on the first subband resource in the first subframe; and sending, by the base station, the unicast data information to the user equipment in a subframe that is used for transmitting the unicast data information and indicated by the unicast control information.

That is, when the information is specifically the unicast control information, step 303 may be specifically as follows: The base station may transmit the unicast control information on the first subband resource in the first subframe. In this case, after the base station sends the unicast control information to the user equipment, the base station continues to send the unicast data information to the user equipment in the subframe that is used for transmitting the unicast data information and indicated by the unicast control information. Because the user equipment may determine, according to the unicast control information, the subframe for transmitting the unicast data information scheduled by using the unicast control information, the user equipment may receive the unicast data information in the determined subframe for transmitting the unicast data information. That is, after receiving the unicast control information, the user equipment finds, by parsing the unicast control information, one or more subframes in which the unicast data information scheduled by using the unicast control information is transmitted. The user equipment may receive, according to an indication of the unicast control information, the unicast data information associated with the unicast control information.

In some other embodiments of the present invention, the sending, by the base station, the information to the user equipment on the first subband resource in the first subframe in step 303 may specifically include the following steps:

determining, by the base station, an information priority; and according to the determined information priority, sending, by the base station, first information with a highest priority on the first subband resource in the first subframe, and skipping sending second information on the first subband resource in the first subframe, where a priority of the second information is lower than that of the first information.

Specifically, the base station first determines the information priority. Optionally, the base station may determine the information priority according to prespecification. The base station sends information with a high priority. For example, the prespecification is a protocol agreement. Optionally, the base station autonomously determines the information priority. The base station may notify the user equipment of the information priority by using higher layer signaling, a system broadcast message, or physical layer signaling.

Further, the base station may determine, according to the information priority, to send the information with the high priority to the user equipment on a subband resource on which the information with the high priority is located. The base station may determine, according to the information priority, whether to send the unicast information or the common information in a subframe. Alternatively, the base station may determine, according to the information priority, not to send the unicast information to the user equipment in the first subframe. Alternatively, the base station may determine, according to the information priority, not to send the common information to the user equipment in the first subframe.

For example, in the first subframe, considering that the user equipment cannot simultaneously receive the unicast information and the common information, the base station may determine, in the first subframe according to an information sending priority, to send information with a high priority. For example, if it is prespecified that a priority of sending, by the base station, a random access response or control information for scheduling a random access response is higher than that of sending the unicast information by the base station, in the first subframe, the base station sends the random access response or the control information for scheduling the random access response. In addition, it may be prespecified for the information priority that a priority of sending, by the base station, a paging message or control information for scheduling a paging message is higher than that of sending the unicast information by the base station. Therefore, in a paging subframe of the base station, the base station sends the paging message or the control information for scheduling the paging message, and does not send the unicast information. For another example, it may be prespecified for the information priority that a priority of sending, by the base station, system information or control information for scheduling system information is higher than that of sending the unicast information by the base station. Therefore, in a subframe for transmitting the system information, the base station sends the system information or the control information for scheduling the system information. For another example, it is prespecified that a priority of repeatedly transmitted information is higher than that of information transmitted without repetition. For another example, it is prespecified that a priority of information occupying a small frequency width is higher than that of information occupying a large frequency width. For another example, it is prespecified that a priority of information transmitted by means of transmission time interval bundling is higher than that of information transmitted without transmission time interval bundling. For another example, it is prespecified that a priority of information transmitted by means of large transmission time interval bundling is higher than that of information transmitted by means of small transmission time interval bundling. For another example, it is prespecified that a priority of information that is first sent by the base station is higher than that of information that is not sent. For another example, the base station determines the information priority according to an information type. For another example, the base station determines, according to a subband resource occupied for information transmission, a priority of information transmitted on the subband resource.

The following describes, by using an example in which the base station sends a random access response or control information for scheduling a random access response, how to send, according to the predefined information priority, the random access response or the control information for scheduling the random access response. After receiving a random access preamble in an uplink, the base station needs to send a random access response (or control information for scheduling a random access response) in a particular time (the particular time may be the first subframe, and the first subframe is set by means of predefinition or notified by using signaling). However, in the particular time, the base station may also schedule the unicast information for the user equipment. In the particular time, according to the prespecified priority, the base station needs to send only the random access response (or the control information for scheduling the random access response) on a subband resource on which the random access response is located, and does not send the unicast information.

In some embodiments of the present invention, in addition to the foregoing implementation steps, the information transmission method provided in this embodiment of the present invention may further include the following steps:

B1. The base station determines, for the user equipment, second subframe configuration information used to instruct to transmit common information on a second subband resource.

B2. The base station determines, according to the second subframe configuration information, a second subframe in which the user equipment receives the common information on the second subband resource.

B3. The base station sends the common information to the user equipment on the second subband resource in the second subframe.

That is, in this embodiment of the present invention, in addition to step 301 to step 303, the base station further performs steps B1 to B3. In step B1, the second subframe configuration information indicates subframe configuration of receiving the common information by the user equipment on the second subband resource, and the second subband resource is a subband resource different from the first subband resource in frequency. After the base station obtains the second subframe configuration information, the base station determines the second subframe according to the second subframe configuration information. The base station sends the common information on the second subband resource in the second subframe.

With reference to the foregoing implementation manners of step 301 to step 303 and of step B1 to step B3, the following example is used for description. The base station may determine the first subframe configuration information instructing to receive the information on the first subband resource and determine the second subframe configuration information instructing to receive the common information on the second subband resource. Definition of the first subframe configuration information and how to determine the first subframe configuration information are described above. Definition of the second subframe configuration information and how to determine the second subframe configuration information are also described above. The base station determines, according to the first subframe configuration information, the first subframe for sending the information on the first subband resource, and determines, according to the second subframe configuration information, the second subframe for sending the common information on the second subband resource. The base station sends the unicast information on the first subband resource in the determined first subframe, and sends the common information on the second subband resource in the determined second subframe.

Specifically, the determining, by the base station for the user equipment, second subframe configuration information used to instruct to transmit common information on a second subband resource in step B2 includes:

determining, by the base station, the second subframe for the user equipment, where the second subframe is a subframe in which the user equipment receives the common information on the second subband resource;

determining, by the base station according to a preset correspondence, a second subframe configuration index corresponding to second subframe configuration; and generating, by the base station, the second subframe configuration information, where the second subframe configuration information includes the second subframe configuration index.

Specifically, first, the base station determines one or more subframes in which the user equipment receives the information on the second subband resource. The base station defines the determined subframe as the second subframe. Then, the base station determines the second subframe configuration index according to the correspondence, and finally adds the second subframe configuration index to the generated second subframe configuration information.

In some embodiments of the present invention, the second subframe configuration information includes one or more of the following content: a subframe for the common information, a start subframe for the common information, a subframe period for the common information, a radio frame for the common information, a radio frame number for the common information, a radio frame period for the common information, a quantity of subframes occupied by the common information, a quantity of radio frames occupied by the common information, a quantity of symbols occupied by the common information, or a start symbol for the common information.

The second subframe configuration information may include one or more fields. Each field indicates one or more types of information in the second subframe configuration. Particularly, the second subframe configuration information includes only one field, and the field indicates the second subframe configuration index. Optionally, there is a predefined correspondence (such as a table relationship or a function relationship) between the second subframe configuration index and the second subframe configuration. The second subframe configuration index is determined according to the second subframe configuration. In addition, it should be noted that in this embodiment of the present invention, a manner for adding, by the base station, the second subframe configuration index to the second subframe configuration information to generate the second subframe configuration information is not limited to a manner of using the second subframe configuration index, and there may be another implementation means. For example, the base station determines the second subframe according to the start subframe for sending the common information and the quantity of subframes occupied for sending the common information. The base station may add, to the second subframe configuration information, information about the start subframe for sending the common information and information about the quantity of subframes occupied for sending the common information.

It can be learned from the description of the present invention in the foregoing embodiment that a base station first determines, for user equipment, first subframe configuration information used to instruct to transmit information on a first subband resource. Then, the base station determines, according to the first subframe configuration information, a first subframe for sending the information on the first subband resource. The base station sends the information only on the first subband resource in the first subframe. The base station may determine, according to the first subframe configuration information, the first subframe that may be used for sending the information, and determine the first subband resource needed for sending the information. The base station may send the information only on the first subband resource in the first subframe. Therefore, a problem that low-complexity or low-cost user equipment cannot simultaneously receive two types of information is resolved, and a waste of system resources is avoided.

Figure 4:
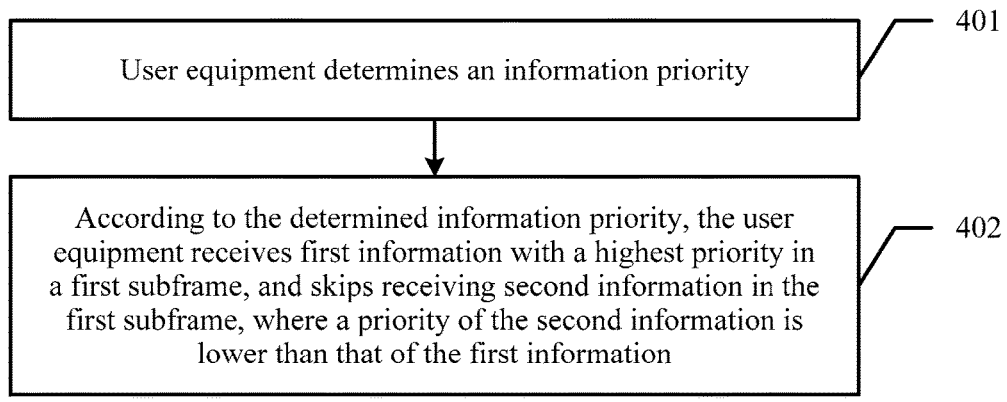
FIG. 4 is a schematic block diagram of a procedure of another information transmission method according to an embodiment of the present invention.

The following describes another information transmission method provided in an embodiment of the present invention. As shown in FIG. 4, the method may mainly include the following steps.

401. User equipment determines an information priority.

In this embodiment of the present invention, multiple subband resources may be configured by a base station, and the user equipment may receive information on the multiple subband resources. For example, multiple subband resources are configured on a carrier. However, low-complexity or low-cost user equipment cannot simultaneously receive multiple pieces of information from multiple subbands. In such an application scenario, a process in which the user equipment receives information in a first subframe is used as an example for description. The user equipment in this embodiment of the present invention needs to first determine the information priority. The information priority refers to a sequence of different information preferentially received on a user equipment side.

In some embodiments of the present invention, the determining, by user equipment, an information priority may specifically include the following steps:

determining, by the user equipment, the information priority according to an information type; and/or determining, by the user equipment according to a subband resource occupied for information transmission, a priority of information transmitted on the subband resource.

The user equipment may determine, according to the information priority, whether to receive unicast information or common information in a subframe. The user equipment may obtain the information priority by using higher layer signaling, a system broadcast message, or physical layer signaling. Optionally, the user equipment may determine the information priority according to prespecification, and receive information with a high priority. For example, the prespecification is a protocol agreement. That is, the information priority may be determined according to the information type. For example, a priority of the unicast information may be preset to be higher than that of the common information. Alternatively, a priority of the common information may be preset to be higher than that of the unicast information. In addition, the information priority may be determined according to the subband resource occupied for information transmission. For example, two subbands: a subband 1 and a subband 2 are configured in a system. A priority of information transmitted on the subband 1 may be preset to be higher than that of information transmitted on the subband 2.

402. According to the determined information priority, the user equipment receives first information with a highest priority in a first subframe, and skips receiving second information in the first subframe, where a priority of the second information is lower than that of the first information.

In this embodiment of the present invention, in a subframe, the base station may simultaneously schedule unicast information and common information for the user equipment, but the user equipment does not need to determine whether the unicast information and the common information are simultaneously transmitted in a subframe (for example, the first subframe). The user equipment only needs to determine, according to the prespecified priority, whether to receive the unicast information or the common information in the first subframe. The information priority may be set in multiple implementation manners. For example, it is prespecified that a priority of receiving, by the user equipment, a random access response or control information for scheduling a random access response is higher than that of receiving the unicast information by the user equipment. For example, it is prespecified that a priority of receiving, by the user equipment, a paging message or control information for scheduling a paging message is higher than that of receiving the unicast information by the user equipment. Therefore, in a paging subframe of the user equipment, the user equipment receives the paging message or the control information for scheduling the paging message, and does not receive the unicast information. For another example, it is prespecified that a priority of receiving, by the user equipment, system information or control information for scheduling system information is higher than that of receiving the unicast information by the user equipment. Therefore, in a subframe for transmitting the system information, the user equipment receives only the system information or only the control information for scheduling the system information. For another example, it is prespecified that a priority of repeatedly transmitted information is higher than that of information transmitted without repetition. For another example, it is prespecified that a priority of information occupying a small frequency width is higher than that of information occupying a large frequency width. For another example, it is prespecified that a priority of information transmitted by means of transmission time interval bundling is higher than that of information transmitted without transmission time interval bundling. For another example, it is prespecified that a priority of information transmitted by means of large transmission time interval bundling is higher than that of information transmitted by means of small transmission time interval bundling. For another example, it is prespecified that a priority of information that is first received by the user equipment is higher than that of information that is not received.

The following describes, by using an example in which the user equipment receives a random access response or control information for scheduling a random access response, how to receive, according to the predefined priority, the random access response or the control information for scheduling the random access response. After sending a random access preamble in an uplink, the user equipment needs to receive a random access response (or control information for scheduling a random access response) in a particular time (the particular time may be the first subframe, and the first subframe is set by means of predefinition or notified by using signaling). However, in the particular time, the base station may also schedule the unicast information for the user equipment, but the user equipment does not need to determine whether the unicast information and the random access response (or the control information for scheduling the random access response) are simultaneously transmitted in the particular time. The user equipment needs to receive only the random access response (or the control information for scheduling the random access response) in the particular time according to the prespecified priority.

Figures 5, 6:
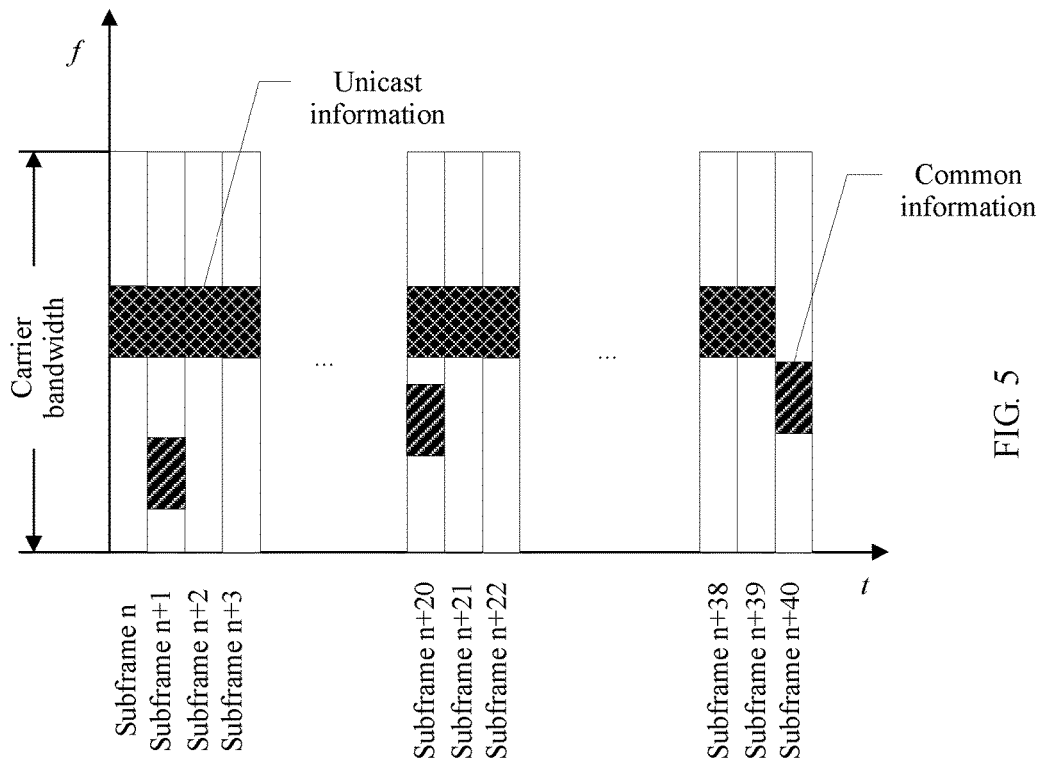
FIG. 5 is a schematic diagram of another manner of transmitting unicast information and common information according to an embodiment of the present invention.
FIG. 6 is a schematic block diagram of a procedure of another information transmission method according to an embodiment of the present invention.

The following describes, by using an example, how to receive information according to that the priority of information that is first received is higher than that of information that is not received. As shown in FIG. 5, FIG. 5 is a schematic diagram of another manner of transmitting the unicast information and the common information according to this embodiment of the present invention. The unicast information is transmitted in subframes n to n+39, and the common information is transmitted in the subframe n+1, the subframe n+20, and a subframe n+40. Because the user equipment first receives the unicast information (that is, information that is first received) in the subframe n, a priority of the unicast information is higher than that of the common information (that is, information that is not received). Therefore, in the subframe n+1, the subframe n+20, and the subframe n+40, the user equipment receives the unicast information and does not receive the common information.

It can be learned from the description of this embodiment of the present invention that according to an information priority, in a first subframe, user equipment receives only first information with a highest priority and does not receive second information whose priority is lower than that of the first information. Therefore, a problem about how the user equipment receives unicast information or common information is resolved. The user equipment is prevented from blind detection, system resource overheads are reduced, and power consumption of the user equipment is reduced.

The following describes another information transmission method provided in an embodiment of the present invention. As shown in FIG. 6, the method may mainly include the following steps.

601. A base station determines, according to a common identifier between the base station and user equipment, a first subframe in which the user equipment receives information on a first subband resource.

In this embodiment of the present invention, the base station may configure multiple subband resources, and the user equipment may receive information on the multiple subband resources. For example, multiple subband resources are configured on a carrier. However, low-complexity or low-cost user equipment cannot simultaneously receive multiple pieces of information from multiple subbands. In such an application scenario, a process in which the base station sends the information in the first subframe is used as an example for description. In this embodiment of the present invention, the common identifier is preset between the base station and the user equipment. The base station determines, by using the common identifier, the first subframe in which the user equipment receives the information on the first subband resource.

In this embodiment of the present invention, the base station allocates a radio network temporary identifier (Radio Network Temporary Identifier, RNTI) to user equipment in connected state. In a communication process, the base station identifies the user equipment in connected state by using the radio network temporary identifier of the user equipment. Because there is no correspondence between a random access preamble and the radio network temporary identifier, after receiving the random access preamble of the user equipment, the base station cannot determine the user equipment that sends the random access preamble. Therefore, a preamble index is carried in a random access response sent by the base station. Although the base station sends the random access response (or control information for scheduling the random access response) to user equipment in connected state, actually, the base station does not know user equipment in connected state to which the random access response (or the control information for scheduling the random access response) is sent.

In addition, paging information is sent by the base station to the user equipment based on a paging frame and a paging subframe notified by a mobility management entity. There is also no correspondence between the RNTI and each of the paging frame and the paging subframe. Therefore, although the base station sends paging information (or control information for scheduling paging information) to user equipment in connected state, actually, the base station does not know the user equipment in connected state to which the paging information (or the control information for scheduling the paging information) is sent.

In this way, the base station inevitably simultaneously sends unicast information and common information to user equipment in connected state. To prevent the user equipment from simultaneously receiving the unicast information and the common information, a method in which the base station does not simultaneously send the unicast information and the common information may be used in this embodiment of the present invention. The following describes about how to enable the base station not to simultaneously send the unicast information and the common information.

In an implementation manner of the present invention, the base station and the user equipment may determine a common identifier. The base station can identify user equipment in connected state by using the identifier. The identifier may be user-equipment-specific information.

The user-equipment-specific information may be user equipment identifier information or other user-specific information. For example, the user equipment identifier information may be an international mobile subscriber identity (IMSI, International Mobile Subscriber Identity), or an international mobile equipment identity (IMEI, International Mobile Equipment Identity), or a temporary mobile subscriber identity (TMSI, Temporary Mobile Subscriber Identity), or an RNTI, or another newly defined identifier. The other user-specific information may be one or more of a preamble sequence or a preamble sequence index selected by the user equipment, information about an access moment selected by the user equipment, information about an access frequency selected by the user equipment, or user-equipment-specific frequency hopping information.

602. The base station sends the information to the user equipment in the first subframe, only on the first subband resource.

In this embodiment of the present invention, the base station may determine, by using the common identifier between the base station and the user equipment, the first subframe in which the user equipment receives the information on the first subband resource, and the base station sends the information to the user equipment only on the first subband resource in the first subframe. The information described herein may be the information or a combination thereof described as examples in the foregoing embodiments. Specifically, the information includes unicast information and the information does not include common information; or the information includes common information and the information does not include unicast information, where the unicast information includes unicast control information and/or unicast data information, and the common information includes common control information and/or common data information.

For example, the base station may determine, according to the common identifier between the base station and the user equipment, a first subframe in which the user equipment identified by the identifier receives a random access response (or control information for scheduling a random access response), and the base station does not send the unicast information to the user equipment at a moment at which the user equipment receives the random access response (or the control information for scheduling the random access response). Therefore, a system resource is saved, and power consumption of the base station is reduced. The base station may determine, according to the identifier, a moment at which the user equipment identified by the identifier receives paging information (or control information for scheduling paging information), and the base station does not send the unicast information to the user equipment at the moment at which the user equipment receives the paging information (or the control information for scheduling the paging information). Therefore, a system resource is saved, and power consumption of the base station is reduced. The base station may determine, according to the identifier, a moment at which the user equipment identified by the identifier receives system information (or control information for scheduling system), and the base station does not send the unicast information to the user equipment at the moment at which the user equipment receives the system information (or the control information for scheduling the system). Therefore, a system resource is saved, and power consumption of the base station is reduced.

In some embodiments of the present invention, in addition to step 601 and step 602, the information transmission method provided in this embodiment of the present invention may further include the following steps:

determining, by the base station according to the common identifier between the base station and the user equipment, a second subframe in which the user equipment receives common information on a second subband resource; and sending, by the base station, the common information to the user equipment in the second subframe, only on the second subband resource.

For example, when in addition to the first subband resource, the second subband resource is further included on a carrier bandwidth, the base station determines, according to the common identifier between the base station and the user equipment, the second subframe in which the user equipment receives the common information on the second subband resource. The base station sends the common information to the user equipment in the second subframe, only on the second subband resource.

In some embodiments of the present invention, wherein the information sent by the base station to the user equipment on the first subband resource in the first subframe includes unicast information, and the sent information does not include common information; or the information sent by the base station to the user equipment on the second subband resource in the second subframe includes common information, and the sent information does not include unicast information.

It can be learned from the description of the present invention in the foregoing embodiment that a common identifier is preset between a base station and user equipment. The base station may identify user equipment in connected state. The base station determines, for the user equipment by using the common identifier, a first subframe in which the user equipment receives information. Then, the base station sends the information to the user equipment in the first subframe, only on a first subband resource. Therefore, a problem that the base station simultaneously sends common information and unicast information may be avoided, and a waste of system resources may be avoided.

Figure 7:
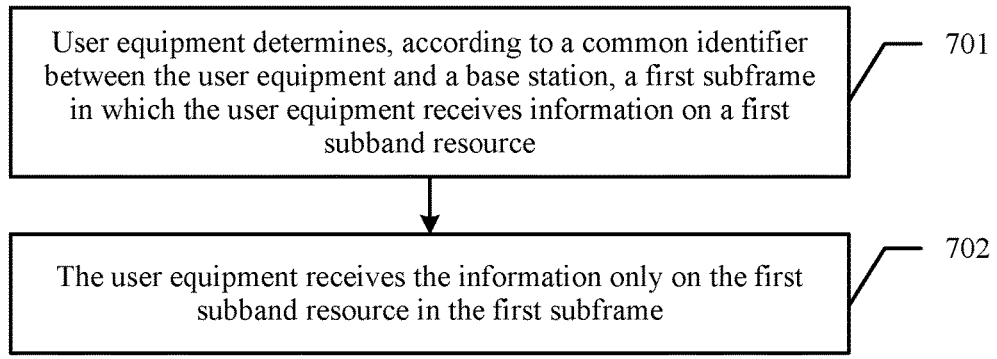
FIG. 7 is a schematic block diagram of a procedure of another information transmission method according to an embodiment of the present invention.

Corresponding to the information transmission method implemented on a base station side and shown in FIG. 6, the following describes, from a user equipment side, an information transmission method provided in an embodiment of the present invention. As shown in FIG. 7, the method may mainly include the following steps.

701. User equipment determines, according to a common identifier between the user equipment and a base station, a first subframe in which the user equipment receives information on a first subband resource.

In an implementation manner of the present invention, the base station and the user equipment may determine the common identifier. The user equipment determines, by using the common identifier between the base station and the user equipment, that the user equipment may receive the information in the first subframe. The base station can identify user equipment in connected state by using the identifier. The identifier may be user-equipment-specific information. The user-equipment-specific information may be user equipment identifier information or other user-specific information. For example, the user equipment identifier information may be an IMSI, or an IMEI, or a TMSI, or an RNTI, or another newly defined identifier. The other user-specific information may be one or more of a preamble sequence or a preamble sequence index selected by the user equipment, information about an access moment selected by the user equipment, information about an access frequency selected by the user equipment, or user-equipment-specific frequency hopping information.

702. The user equipment receives the information in the first subframe, only on the first subband resource.

In this embodiment of the present invention, after the user equipment determines the first subframe, the user equipment receives the information in the first subframe, only on the first subband resource, and does not receive information on another subband resource other than the first subband resource.

In this embodiment of the present invention, the user equipment may determine, by using the common identifier between the base station and the user equipment, the first subframe in which the user equipment receives the information on the first subband resource, and the user equipment receives the information in the first subframe, only on the first subband resource. The information described herein may be the information or a combination thereof described as examples in the foregoing embodiments. Specifically, the information includes unicast information and the information does not include common information; or the information includes common information and the information does not include unicast information, where the unicast information includes unicast control information and/or unicast data information, and the common information includes common control information and/or common data information.

In some embodiments of the present invention, in addition to step 701 and step 702, the information transmission method provided in this embodiment of the present invention may further include the following steps:

determining, by the user equipment according to the common identifier between the user equipment and the base station, a second subframe in which the user equipment receives common information on a second subband resource; and receiving, by the user equipment, the common information in the second subframe, only on the second subband resource.

When in addition to the first subband resource, the second subband resource is further included on a carrier bandwidth, the user equipment determines, according to the common identifier between the base station and the user equipment, the second subframe in which the user equipment receives the common information on the second subband resource. The user equipment receives the common information in the second subframe, only on the second subband resource.

In some embodiments of the present invention, the receiving, by the user equipment, the information in the first subframe, only on the first subband resource in step 702 is specifically:

the information received by the user equipment on the first subband resource in the first subframe includes unicast information, and the received information does not include common information; or the information transmission method provided in this embodiment of the present invention may further include the following step:

the information received by the user equipment on the second subband resource in the second subframe includes common information, and the received information does not include unicast information.

It can be learned from the description of the present invention in the foregoing embodiment that a common identifier is preset between a base station and user equipment. The base station may identify user equipment in connected state. The base station determines, for the user equipment by using the common identifier, a first subframe in which the user equipment receives information. Then, the base station sends the information to the user equipment in the first subframe, only on a first subband resource. The user equipment may receive the information in the first subframe, only on the first subband resource. Therefore, a problem about how the user equipment receives common information and unicast information is resolved. For the base station, a problem that the base station simultaneously sends the common information and the unicast information may be avoided, and a waste of system resources may be avoided.

It should be noted that, to make the description brief, the foregoing method embodiments are expressed as a series of actions. However, persons skilled in the art should appreciate that the present invention is not limited to the described action sequence, because according to the present invention, some steps may be performed in other sequences or performed simultaneously. In addition, persons skilled in the art should appreciate that all the embodiments described in the specification are examples of embodiments, and the related actions and modules are not necessarily mandatory to the present invention.

To better implement the foregoing solutions in the embodiments of the present invention, related apparatuses used to implement the foregoing solutions are further provided in the following.

Figure 8:
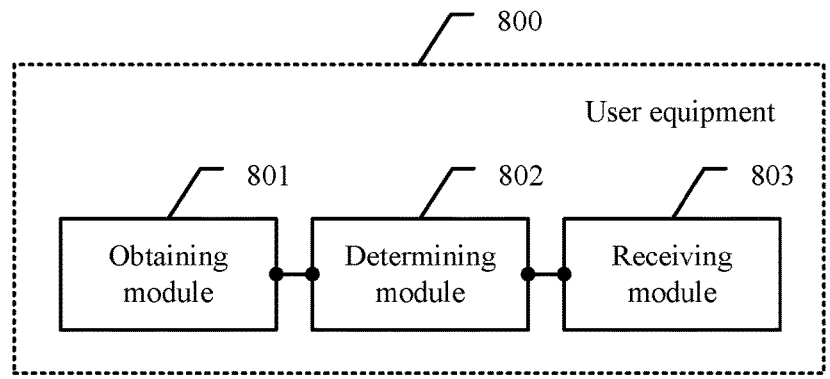
FIG. 8 is a schematic block diagram of a compositional structure of user equipment according to an embodiment of the present invention.

As shown in FIG. 8, user equipment 800 provided in an embodiment of the present invention may include an obtaining module 801, a determining module 802, and a receiving module 803.

The obtaining module 801 is configured to obtain first subframe configuration information used to instruct to receive information on a first subband resource.

The determining module 802 is configured to determine, according to the first subframe configuration information, a first subframe for receiving the information on the first subband resource.

The receiving module 803 is configured to receive the information in the first subframe, only on the first subband resource.

In some embodiments of the present invention, the information includes at least unicast information, where the unicast information includes unicast control information and/or unicast data information.

Alternatively, the information includes at least common information, where the common information includes common control information and/or common data information.

In some embodiments of the present invention, the information includes unicast information and the information does not include common information, where the unicast information includes unicast control information and/or unicast data information, and the common information includes common control information and/or common data information.

In some embodiments of the present invention, the information includes common information and the information does not include unicast information, where the common information includes common control information and/or common data information, and the unicast information includes unicast control information and/or unicast data information.

In some embodiments of the present invention, the determining module 802 includes:

a first obtaining submodule, configured to obtain a first subframe configuration index from the first subframe configuration information;

a first determining submodule, configured to determine, according to a preset correspondence, first subframe configuration corresponding to the first subframe configuration index; and a second determining submodule, configured to determine, according to the first subframe configuration, the first subframe for receiving the information on the first subband resource.

In some embodiments of the present invention, the first subframe configuration information includes one or more of the following content:

a subframe for the unicast information, a start subframe for the unicast information, a subframe period for the unicast information, a radio frame for the unicast information, a radio frame number for the unicast information, a radio frame period for the unicast information, a quantity of subframes occupied by the unicast information, a quantity of radio frames occupied by the unicast information, a quantity of symbols occupied by the unicast information, or a start symbol for the unicast information.

In some embodiments of the present invention, the obtaining module 801 is specifically configured to: obtain the first subframe configuration information according to preconfiguration; or obtain the first subframe configuration information by receiving one or more of radio resource control signaling, Media Access Control signaling, or physical layer signaling.

In some embodiments of the present invention, the obtaining module 801 is further configured to obtain second subframe configuration information used to instruct to receive common information on a second subband resource;

the determining module 802 is further configured to determine, according to the second subframe configuration information, a second subframe for receiving the common information on the second subband resource; and the receiving module 803 is further configured to receive the common information in the second subframe, only on the second subband resource.

In some embodiments of the present invention, the determining module includes:

a second obtaining submodule, configured to obtain a second subframe configuration index from the second subframe configuration information;

a third determining submodule, configured to determine, according to a preset correspondence, second subframe configuration corresponding to the second subframe configuration index; and a fourth determining submodule, configured to determine, according to the second subframe configuration, the second subframe for receiving the common information on the second subband resource.

In some embodiments of the present invention, the second subframe configuration information includes one or more of the following content:

a subframe for the common information, a start subframe for the common information, a subframe period for the common information, a radio frame for the common information, a radio frame number for the common information, a radio frame period for the common information, a quantity of subframes occupied by the common information, a quantity of radio frames occupied by the common information, a quantity of symbols occupied by the common information, or a start symbol for the common information.

In some embodiments of the present invention, the receiving module 803 is specifically configured to receive the unicast control information in the first subframe, only on the first subband resource;

the determining module 802 is further configured to determine, according to the unicast control information, a subframe for transmitting the unicast data information scheduled by using the unicast control information; and the receiving module 803 is further configured to receive the unicast data information in the determined subframe for transmitting the unicast data information.

In some embodiments of the present invention, the receiving module 803 is specifically configured to receive the common control information in the first subframe, only on the first subband resource;

the determining module 802 is further configured to determine, according to the common control information, a subframe for transmitting the common data information scheduled by using the common control information; and the receiving module 801 is further configured to receive the common data information in the determined subframe for transmitting the common data information.

It can be learned from the description of the present invention in the foregoing embodiment that user equipment first obtains first subframe configuration information used to instruct to receive information on a first subband resource. Then, the user equipment determines, according to the first subframe configuration information, a first subframe for receiving the information on the first subband resource. The user equipment receives the information in the first subframe, only on the first subband resource. The user equipment may determine, according to the first subframe configuration information, the first subframe that may be used for receiving the information, and may determine the first subband resource needed for receiving the information. The user equipment may receive the information in the first subframe, only on the first subband resource. A problem that low-complexity or low-cost user equipment cannot simultaneously receive two types of information is resolved, and a base station does not need to be prevented from simultaneously transmitting the two types of information in a same subframe. Therefore, a waste of system resources can be avoided.

Figure 9:
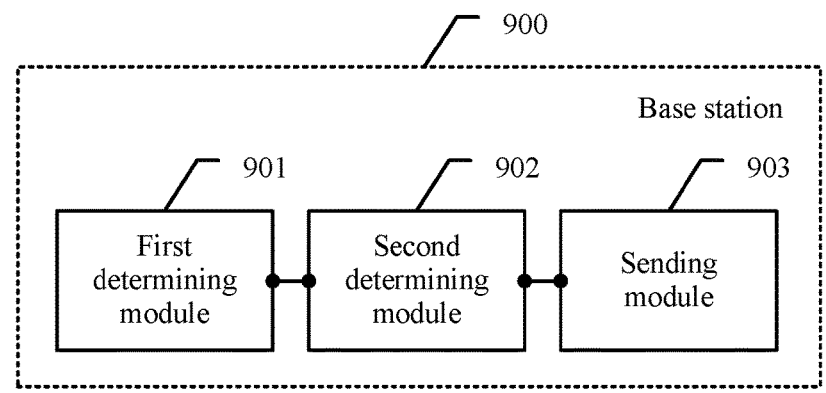
FIG. 9 is a schematic block diagram of a compositional structure of a base station according to an embodiment of the present invention.

As shown in FIG. 9, a base station 900 provided in an embodiment of the present invention may include a first determining module 901, a second determining module 902, and a sending module 903.

The first determining module 901 is configured to determine, for user equipment, first subframe configuration information used to instruct to transmit information on a first subband resource.

The second determining module 902 is configured to determine, according to the first subframe configuration information, a first subframe in which the user equipment receives the information on the first subband resource.

The sending module 903 is configured to send the information to the user equipment on the first subband resource in the first subframe.

In some embodiments of the present invention, the information includes at least unicast information, where the unicast information includes unicast control information and/or unicast data information.

Alternatively, the information includes at least common information, where the common information includes common control information and/or common data information.

In some embodiments of the present invention, the information includes unicast information and the information does not include common information, where the unicast information includes unicast control information and/or unicast data information, and the common information includes common control information and/or common data information.

In some embodiments of the present invention, the information includes common information and the information does not include unicast information, where the common information includes common control information and/or common data information, and the unicast information includes unicast control information and/or unicast data information.

In some embodiments of the present invention, the first determining module 901 is specifically configured to: determine the first subframe for the user equipment, where the first subframe is a subframe in which the user equipment receives the information on the first subband resource; determine, according to a preset correspondence, a first subframe configuration index corresponding to first subframe configuration; and generate the first subframe configuration information, where the first subframe configuration information includes the first subframe configuration index.

In some embodiments of the present invention, the sending module 903 is further configured to send the first subframe configuration information to the user equipment by using one or more of radio resource control signaling, Media Access Control signaling, or physical layer signaling.

In some embodiments of the present invention, the first determining module 901 is further configured to determine, for the user equipment, second subframe configuration information used to instruct to transmit common information on a second subband resource;

the second determining module is further configured to determine, according to the second subframe configuration information, a second subframe in which the user equipment receives the common information on the second subband resource; and the sending module is further configured to send the common information to the user equipment on the second subband resource in the second subframe.

In some embodiments of the present invention, the first determining module 901 is specifically configured to: determine the second subframe for the user equipment, where the second subframe is a subframe in which the user equipment receives the common information on the second subband resource; determine, according to a preset correspondence, a second subframe configuration index corresponding to second subframe configuration; and generate the second subframe configuration information, where the second subframe configuration information includes the second subframe configuration index.

In some embodiments of the present invention, the sending module 903 is specifically configured to: determine an information priority; and according to the determined information priority, send first information with a highest priority on the first subband resource in the first subframe, and skip sending second information on the first subband resource in the first subframe, where a priority of the second information is lower than that of the first information.

In some embodiments of the present invention, the information is specifically the unicast information. The sending module is specifically configured to: send the unicast control information to the user equipment on the first subband resource in the first subframe; and send the unicast data information to the user equipment in a subframe that is used for transmitting the unicast data information and indicated by the unicast control information.

It can be learned from the description of the embodiment of present invention in the foregoing embodiment that a base station first determines for user equipment, first subframe configuration information used to instruct to transmit information on a first subband resource. Then, the base station determines, according to the first subframe configuration information, a first subframe for sending the information on the first subband resource. The base station sends the information in the first subframe, only on the first subband resource. The base station may determine, according to the first subframe configuration information, the first subframe that may be used for sending the information, and may determine the first subband resource needed for sending the information. The base station may send the information in the first subframe, only on the first subband resource. A problem that low-complexity or low-cost user equipment cannot simultaneously receive two types of information is resolved, and a base station does not need to be prevented from simultaneously transmitting the two types of information in a same subframe. Therefore, a waste of system resources can be avoided.

Figure 10:
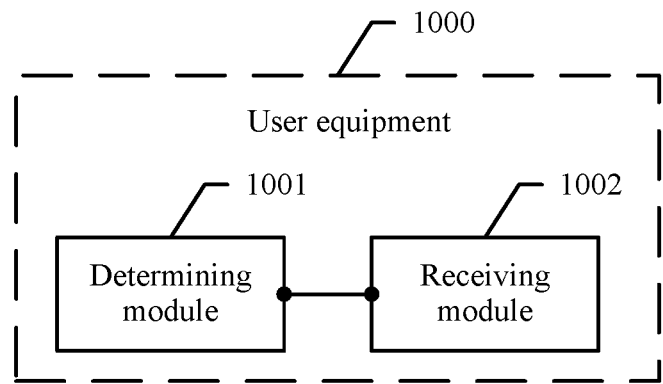
FIG. 10 is a schematic block diagram of a compositional structure of another user equipment according to an embodiment of the present invention.

As shown in FIG. 10, user equipment 1000 provided in an embodiment of the present invention may include a determining module 1001 and a receiving module 1002.

The determining module 1001 is configured to determine an information priority.

The receiving module 1002 is configured to: according to the determined information priority, receive first information with a highest priority in a first subframe, and skip receiving second information in the first subframe, where a priority of the second information is lower than that of the first information.

In some embodiments of the present invention, the determining module 1001 is specifically configured to: determine the information priority according to an information type; and/or determine, according to a subband resource occupied for information transmission, a priority of information transmitted on the subband resource.

It can be learned from the description of this embodiment of the present invention that according to an information priority, in a first subframe, user equipment receives only first information with a highest priority and does not receive second information whose priority is lower than that of the first information. Therefore, a problem about how the user equipment receives unicast information or common information is resolved. The user equipment is prevented from blind detection, system resource overheads are reduced, and power consumption of the user equipment is reduced.

Figure 11:
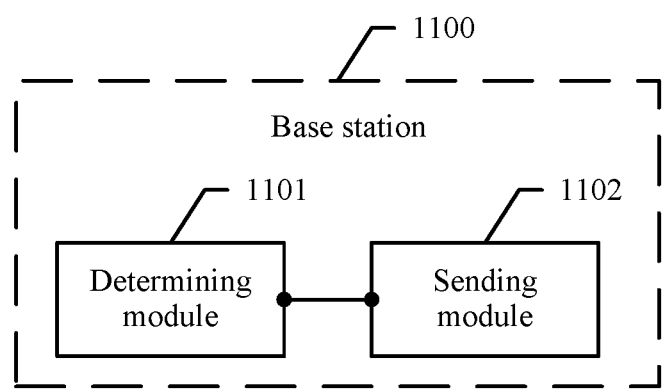
FIG. 11 is a schematic block diagram of a compositional structure of another base station according to an embodiment of the present invention.

As shown in FIG. 11, a base station 1100 provided in an embodiment of the present invention may include a determining module 1101 and a sending module 1102.

The determining module 1101 is configured to determine, according to a common identifier between the base station and user equipment, a first subframe in which the user equipment receives information on a first subband resource.

The sending module 1102 is configured to send the information to the user equipment in the first subframe, only on the first subband resource.

In some embodiments of the present invention, the information includes unicast information and the information does not include common information; or the information includes common information and the information does not include unicast information, where the unicast information includes unicast control information and/or unicast data information, and the common information includes common control information and/or common data information.

In some embodiments of the present invention, the determining module 1101 is further configured to determine, according to the common identifier between the base station and the user equipment, a second subframe in which the user equipment receives common information on a second subband resource; and the sending module 1102 is further configured to send the common information to the user equipment in the first subframe, only on the second subband resource;

In some embodiments of the present invention, the information sent by the sending module 1102 to the user equipment on the first subband resource in the first subframe includes unicast information, and the sent information does not include common information; or the information sent by the sending module 1102 to the user equipment on the second subband resource in the second subframe includes common information, and the sent information does not include unicast information.

It can be learned from the description of the present invention in the foregoing embodiment that a common identifier is preset between a base station and user equipment. The base station may identify user equipment in connected state. The base station determines, for the user equipment by using the common identifier, a first subframe in which the user equipment receives information. Then, the base station sends the information to the user equipment in the first subframe, only on a first subband resource. Therefore, a problem that the base station simultaneously sends common information and unicast information may be avoided, and a waste of system resources may be avoided.

Figure 12:
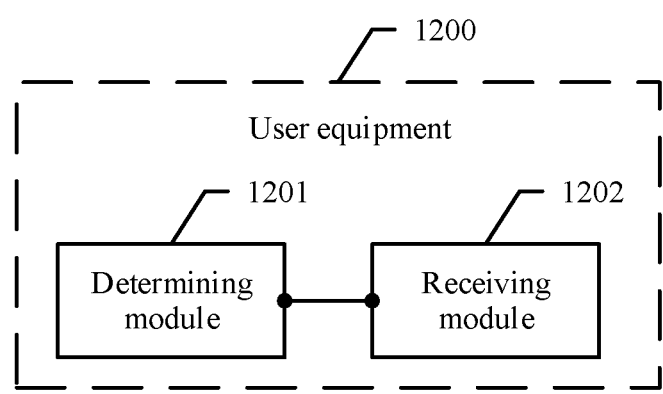
FIG. 12 is a schematic block diagram of a compositional structure of another user equipment according to an embodiment of the present invention.

As shown in FIG. 12, user equipment 1200 provided in an embodiment of the present invention may include a determining module 1201 and a receiving module 1202.

The determining module 1201 is configured to determine, according to a common identifier between the user equipment and a base station, a first subframe in which the user equipment receives information on a first subband resource.

The receiving module 1202 is configured to receive the information in the first subframe, only on the first subband resource.

In some embodiments of the present invention, the information includes unicast information and the information does not include common information; or the information includes common information and the information does not include unicast information, where the unicast information includes unicast control information and/or unicast data information, and the common information includes common control information and/or common data information.

In some embodiments of the present invention, the determining module 1201 is further configured to determine, according to the common identifier between the user equipment and the base station, a second subframe in which the user equipment receives common information on a second subband resource.

The receiving module 1202 is further configured to receive the common information in the first subframe, only on the second subband resource.

In some embodiments of the present invention, the information received by the receiving module 1202 on the first subband resource in the first subframe includes unicast information, and the received information does not include common information; or the information received by the receiving module 1202 on the second subband resource in the second subframe includes common information, and the received information does not include unicast information.

It can be learned from the description of the present invention in the foregoing embodiment that a common identifier is preset between a base station and user equipment. The base station may identify user equipment in connected state. The base station determines, for the user equipment by using the common identifier, a first subframe in which the user equipment receives information. Then, the base station sends the information to the user equipment in the first subframe, only on a first subband resource. The user equipment may receive the information in the first subframe, only on the first subband resource. Therefore, a problem about how the user equipment receives common information and unicast information is resolved. For the base station, a problem that the base station simultaneously sends the common information and the unicast information may be avoided, and a waste of system resources may be avoided.

An embodiment of the present invention further provides a computer storage medium. The computer storage medium stores a program, and the program executes some or all steps recorded in the foregoing method embodiments.

Figure 13:
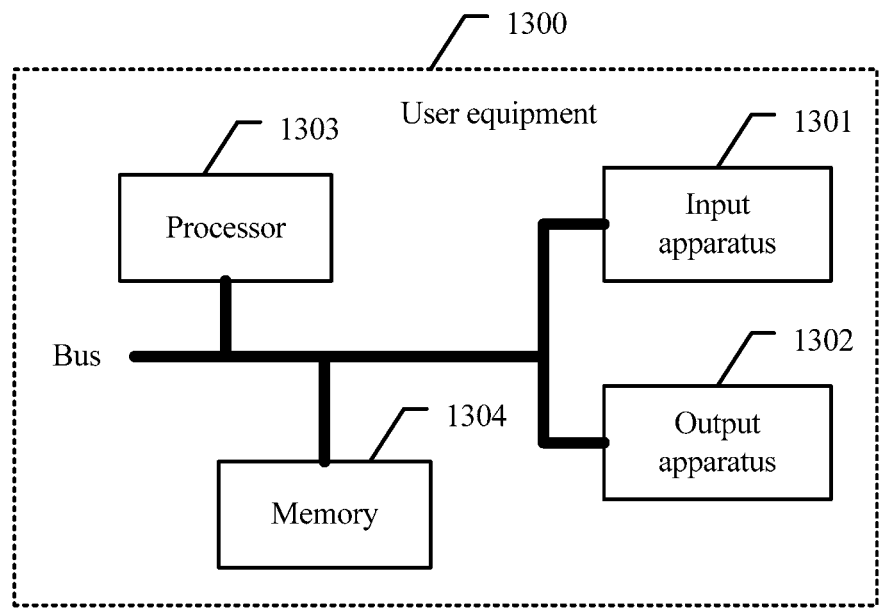
FIG. 13 is a schematic block diagram of a compositional structure of another user equipment according to an embodiment of the present invention.

The following describes another user equipment provided in an embodiment of the present invention. As shown in FIG. 13, user equipment 1300 includes:

an input apparatus 1301, an output apparatus 1302, a processor 1303, and a memory 1304 (there may be one or more processors 1303 in the user equipment 1300, and one processor is used as an example in FIG. 13). In some embodiments of the present invention, the input apparatus 1301, the output apparatus 1302, the processor 1303, and the memory 1304 may be connected to each other by using a bus or in another manner, for example, connected to each other by using a bus in FIG. 13.

The processor 1303 is configured to perform the following steps:

obtaining first subframe configuration information used to instruct to receive information on a first subband resource;

determining, according to the first subframe configuration information, a first subframe for receiving the information on the first subband resource; and receiving the information in the first subframe, only on the first subband resource.

In some embodiments of the present invention, the information stored in the memory 1304 includes at least unicast information, where the unicast information includes unicast control information and/or unicast data information. Alternatively, the information includes at least common information, where the common information includes common control information and/or common data information.

In some embodiments of the present invention, the information stored in the memory 1304 includes unicast information and the information does not include common information, where the unicast information includes unicast control information and/or unicast data information, and the common information includes common control information and/or common data information.

In some embodiments of the present invention, the information stored in the memory 1304 includes common information and the information does not include unicast information, where the common information includes common control information and/or common data information, and the unicast information includes unicast control information and/or unicast data information.

In some embodiments of the present invention, the processor 1303 is specifically configured to perform the following steps:

obtaining a first subframe configuration index from the first subframe configuration information;

determining, according to a preset correspondence, first subframe configuration corresponding to the first subframe configuration index; and determining, according to the first subframe configuration, the first subframe for receiving the information on the first subband resource.

In some embodiments of the present invention, the first subframe configuration information stored in the memory 1304 includes one or more of the following content:

a subframe for the unicast information, a start subframe for the unicast information, a subframe period for the unicast information, a radio frame for the unicast information, a radio frame number for the unicast information, a radio frame period for the unicast information, a quantity of subframes occupied by the unicast information, a quantity of radio frames occupied by the unicast information, a quantity of symbols occupied by the unicast information, or a start symbol for the unicast information.

In some embodiments of the present invention, the processor 1303 is specifically configured to perform the following step:

obtaining the first subframe configuration information according to preconfiguration; or obtaining the first subframe configuration information by receiving one or more of radio resource control signaling, Media Access Control signaling, or physical layer signaling.

In some embodiments of the present invention, the processor 1303 is further configured to perform the following steps:

obtaining second subframe configuration information used to instruct to receive common information on a second subband resource;

determining, according to the second subframe configuration information, a second subframe for receiving the common information on the second subband resource; and receiving the common information in the second subframe, only on the second subband resource.

In some embodiments of the present invention, the processor 1303 is specifically configured to perform the following steps:

obtaining a second subframe configuration index from the second subframe configuration information;

determining, according to a preset correspondence, second subframe configuration corresponding to the second subframe configuration index; and determining, according to the second subframe configuration, the second subframe for receiving the common information on the second subband resource.

In some embodiments of the present invention, the second subframe configuration information stored in the memory 1304 includes one or more of the following content:

a subframe for the common information, a start subframe for the common information, a subframe period for the common information, a radio frame for the common information, a radio frame number for the common information, a radio frame period for the common information, a quantity of subframes occupied by the common information, a quantity of radio frames occupied by the common information, a quantity of symbols occupied by the common information, or a start symbol for the common information.

In some embodiments of the present invention, the processor 1303 is specifically configured to perform the following step:

receiving the unicast control information in the first subframe, only on the first subband resource.

The processor 1303 is further configured to perform the following steps:

determining, according to the unicast control information, a subframe for transmitting the unicast data information scheduled by using the unicast control information; and receiving the unicast data information in the determined subframe for transmitting the unicast data information.

In some embodiments of the present invention, the processor 1303 is specifically configured to perform the following step:

receiving the common control information in the first subframe, only on the first subband resource.

The processor 1303 is further configured to perform the following steps:

determining, according to the common control information, a subframe for transmitting the common data information scheduled by using the common control information; and receiving the common data information in the determined subframe for transmitting the common data information.

The following describes another user equipment provided in an embodiment of the present invention. As shown in FIG. 13, user equipment 1300 includes:

an input apparatus 1301, an output apparatus 1302, a processor 1303, and a memory 1304 (there may be one or more processors 1303 in the user equipment 1300, and one processor is used as an example in FIG. 13). In some embodiments of the present invention, the input apparatus 1301, the output apparatus 1302, the processor 1303, and the memory 1304 may be connected to each other by using a bus or in another manner, for example, connected to each other by using a bus in FIG. 13.

The processor 1303 is configured to perform the following steps:

determining an information priority; and according to the determined information priority, receiving first information with a highest priority in a first subframe, and skipping receiving second information in the first subframe, where a priority of the second information is lower than that of the first information.

In some embodiments of the present invention, the processor 1303 is specifically configured to perform the following steps:

determining the information priority according to an information type; and/or determining, according to a subband resource occupied for information transmission, a priority of information transmitted on the subband resource.

The following describes another user equipment provided in an embodiment of the present invention. As shown in FIG. 13, user equipment 1300 includes:

an input apparatus 1301, an output apparatus 1302, a processor 1303, and a memory 1304 (there may be one or more processors 1303 in the user equipment 1300, and one processor is used as an example in FIG. 13). In some embodiments of the present invention, the input apparatus 1301, the output apparatus 1302, the processor 1303, and the memory 1304 may be connected to each other by using a bus or in another manner, for example, connected to each other by using a bus in FIG. 13.

The processor 1303 is configured to perform the following steps:

determining, according to a common identifier between the user equipment and a base station, a first subframe in which the user equipment receives information on a first subband resource; and receiving the information in the first subframe, only on the first subband resource.

In some embodiments of the present invention, the information stored in the memory 1304 includes unicast information and the information does not include common information; or the information includes common information and the information does not include unicast information, where the unicast information includes unicast control information and/or unicast data information, and the common information includes common control information and/or common data information.

In some embodiments of the present invention, the processor 1303 is further configured to perform the following steps:

determining, according to the common identifier between the user equipment and the base station, a second subframe in which the user equipment receives common information on a second subband resource; and receiving the common information in the first subframe, only on the second subband resource.

In some embodiments of the present invention, the processor 1303 is specifically configured to perform the following step:

the information received on the first subband resource in the first subframe includes unicast information, and the received information does not include common information.

Alternatively, in some embodiments of the present invention, the processor 1303 is further configured to perform the following step:

the information received on the second subband resource in the second subframe includes common information, and the received information does not include unicast information.

Figure 14:
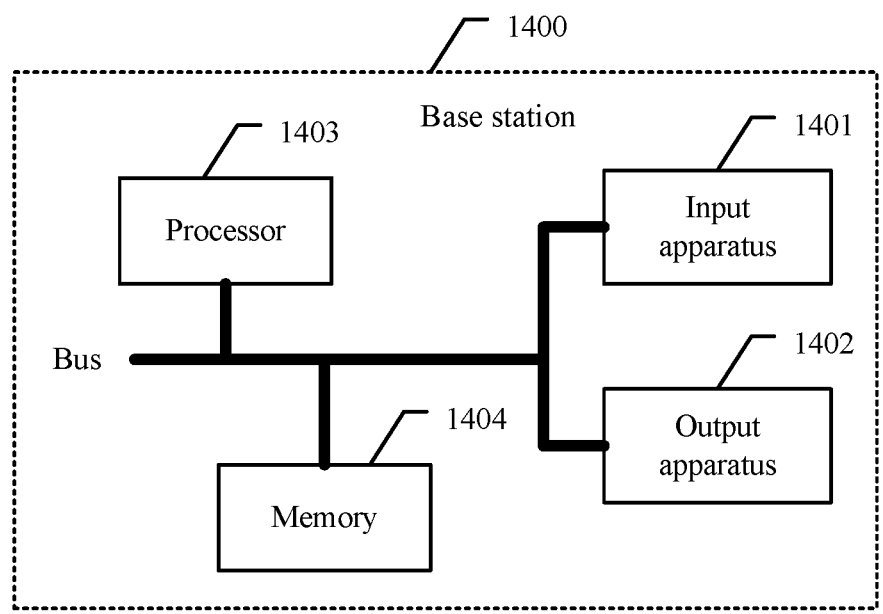
FIG. 14 is a schematic block diagram of a compositional structure of another base station according to an embodiment of the present invention.

The following describes another base station provided in an embodiment of the present invention. As shown in FIG. 14, a base station 1400 includes:

an input apparatus 1401, an output apparatus 1402, a processor 1403, and a memory 1404 (there may be one or more processors 1403 in the base station 1400, and one processor is used as an example in FIG. 14). In some embodiments of the present invention, the input apparatus 1401, the output apparatus 1402, the processor 1403, and the memory 1404 may be connected to each other by using a bus or in another manner, for example, connected to each other by using a bus in FIG. 14.

The processor 1403 is configured to perform the following steps:

determining, for user equipment, first subframe configuration information used to instruct to transmit information on a first subband resource;

determining, according to the first subframe configuration information, a first subframe in which the user equipment receives the information on the first subband resource; and sending the information to the user equipment on the first subband resource in the first subframe.

In some embodiments of the present invention, the information stored in the memory 1404 includes at least unicast information, where the unicast information includes unicast control information and/or unicast data information.

Alternatively, the information includes at least common information, where the common information includes common control information and/or common data information.

In some embodiments of the present invention, the information stored in the memory 1404 includes unicast information and the information does not include common information, where the unicast information includes unicast control information and/or unicast data information, and the common information includes common control information and/or common data information.

In some embodiments of the present invention, the information stored in the memory 1404 includes common information and the information does not include unicast information, where the common information includes common control information and/or common data information, and the unicast information includes unicast control information and/or unicast data information.

In some embodiments of the present invention, the processor 1403 is specifically configured to perform the following steps:

determining the first subframe for the user equipment, where the first subframe is a subframe in which the user equipment receives the information on the first subband resource;

determining, according to a preset correspondence, a first subframe configuration index corresponding to first subframe configuration; and generating the first subframe configuration information, where the first subframe configuration information includes the first subframe configuration index.

In some embodiments of the present invention, the processor 1403 is further configured to perform the following step:

sending the first subframe configuration information to the user equipment by using one or more of radio resource control signaling, Media Access Control signaling, or physical layer signaling.

In some embodiments of the present invention, the processor 1403 is further configured to perform the following steps:

determining, for the user equipment, second subframe configuration information used to instruct to transmit common information on a second subband resource;

determining, according to the second subframe configuration information, a second subframe in which the user equipment receives the common information on the second subband resource; and sending the common information to the user equipment on the second subband resource in the second subframe.

In some embodiments of the present invention, the processor 1403 is further configured to perform the following steps:

determining the second subframe for the user equipment, where the second subframe is a subframe in which the user equipment receives the common information on the second subband resource;

determining, according to a preset correspondence, a second subframe configuration index corresponding to second subframe configuration; and generating the second subframe configuration information, where the second subframe configuration information includes the second subframe configuration index.

In some embodiments of the present invention, the processor 1403 is specifically configured to perform the following steps:

determining an information priority; and according to the determined information priority, sending first information with a highest priority on the first subband resource in the first subframe, and skipping sending second information on the first subband resource in the first subframe, where a priority of the second information is lower than that of the first information.

The information is specifically the unicast information, and in some embodiments of the present invention, the processor 1403 is specifically configured to perform the following steps:

sending the unicast control information to the user equipment on the first subband resource in the first subframe; and continuing to send the unicast data information to the user equipment in a subframe that is used for transmitting the unicast data information and indicated by the unicast control information.

The following describes another base station provided in an embodiment of the present invention. As shown in FIG. 14, a base station 1400 includes:

an input apparatus 1401, an output apparatus 1402, a processor 1403, and a memory 1404 (there may be one or more processors 1403 in the base station 1400, and one processor is used as an example in FIG. 14). In some embodiments of the present invention, the input apparatus 1401, the output apparatus 1402, the processor 1403, and the memory 1404 may be connected to each other by using a bus or in another manner, for example, connected to each other by using a bus in FIG. 14.

The processor 1403 is configured to perform the following steps:

determining, according to a common identifier between the base station and user equipment, a first subframe in which the user equipment receives information on a first subband resource; and sending the information to the user equipment in the first subframe, only on the first subband resource.

In some embodiments of the present invention, the information stored in the memory 1404 includes unicast information and the information does not include common information; or the information includes common information and the information does not include unicast information, where the unicast information includes unicast control information and/or unicast data information, and the common information includes common control information and/or common data information.

In some embodiments of the present invention, the processor 1403 is specifically configured to perform the following steps:

determining, according to the common identifier between the base station and the user equipment, a second subframe in which the user equipment receives common information on a second subband resource; and sending the common information to the user equipment in the second subframe, only on the second subband resource.

In some embodiments of the present invention, the processor 1403 is specifically configured to perform the following step:

the information sent to the user equipment on the first subband resource in the first subframe includes unicast information, and the sent information does not include common information.

Alternatively, in some embodiments of the present invention, the processor 1403 is further configured to perform the following step: the information sent to the user equipment on the first subband resource in the first subframe includes common information, and the sent information does not include unicast information.

In addition, it should be noted that the described apparatus embodiments are merely examples. The units described as separate parts may or may not be physically separate, and parts displayed as units may or may not be physical units, may be located in one position, or may be distributed on multiple network units. Some or all of the modules may be selected according to actual needs to achieve the objectives of the solutions of the embodiments. In addition, in the accompanying drawings of the apparatus embodiments provided by the present invention, connection relationships between modules indicate that the modules have communication connections with each other, which may be specifically implemented as one or more communications buses or signal cables. Persons of ordinary skill in the art may understand and implement the embodiments of the present invention without creative efforts.

Based on the description of the foregoing implementation manners, persons skilled in the art may clearly understand that the present invention may be implemented by software in addition to necessary universal hardware, or by dedicated hardware, including a dedicated integrated circuit, a dedicated CPU, a dedicated memory, a dedicated component, and the like. Generally, any functions that can be performed by a computer program can be easily implemented by using corresponding hardware. Moreover, a specific hardware structure used to achieve a same function may be of various forms, for example, in a form of an analog circuit, a digital circuit, a dedicated circuit, or the like. However, for the present invention, software program implementation is a better implementation manner in most cases. Based on such an understanding, the technical solutions of the present invention essentially or the part contributing to the prior art may be implemented in a form of a software product. The computer software product is stored in a readable storage medium, such as a floppy disk, a USB flash drive, a removable hard disk, a read-only memory (ROM, Read-Only Memory), a random access memory (RAM, Random Access Memory), a magnetic disk, or an optical disc of a computer, and includes several instructions for instructing a computer device (which may be a personal computer, a server, a network device, or the like) to perform the methods described in the embodiments of the present invention.

In conclusion, the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions recorded in the foregoing embodiments or make equivalent replacements to some technical features thereof, without departing from the scope of the technical solutions of the embodiments of the present invention.

The invention claimed is:

1. A low-complexity user equipment, comprising:
a processor and a memory, wherein the memory stores an execution instruction; and when the user equipment runs, the processor executes the execution instruction to enable the user equipment to perform the following steps:
obtaining, first subframe configuration information used to instruct to receive information on a first narrowband resource, the first narrowband resource comprises a frequency resource that is capable to be supported or processed by the low-complexity user equipment;
determining, according to the first subframe configuration information, a first subframe for receiving the information on the first narrowband resource; and
receiving, the information in the first subframe, only on the first narrowband resource;
wherein the information comprises common information and the information does not comprise user-specific information, and the common information comprises one or more of:
random access response information, or control information for scheduling the random access response information.

2. The user equipment according to claim 1, wherein the determining, according to the first subframe configuration information, a first subframe for receiving the information on the first narrowband resource comprises:
obtaining a first subframe configuration index from the first subframe configuration information;
determining according to a preset correspondence, first subframe configuration corresponding to the first subframe configuration index; and
determining according to the first subframe configuration, the first subframe for receiving the information on the first narrowband resource.

3. The user equipment according to claim 1, wherein the first subframe configuration information comprises one or more of the following content:
a subframe for the unicast information, a start subframe for the unicast information, a subframe period for the unicast information, a radio frame for the unicast information, a radio frame number for the unicast information, a radio frame period for the unicast information, a quantity of subframes occupied by the unicast information, a quantity of radio frames occupied by the unicast information, a quantity of symbols occupied by the unicast information, or a start symbol for the unicast information.

4. The user equipment according to claim 1, wherein the obtaining, by user equipment, first subframe configuration information used to instruct to receive information on a first narrowband resource comprises:
obtaining the first subframe configuration information by receiving one or more of radio resource control signaling, Media Access Control signaling, or physical layer signaling.

5. The user equipment according to claim 1, wherein the following steps further comprises:
obtaining second subframe configuration information used to instruct to receive common information on a second narrowband resource;
determining according to the second subframe configuration information, a second subframe for receiving the common information on the second narrowband resource; and
receiving the common information only on the second narrowband resource in the second subframe.

6. The user equipment according to claim 5, wherein the determining, by the user equipment according to the second subframe configuration information, a second subframe for receiving the common information on the second narrowband resource comprises:
obtaining a second subframe configuration index from the second subframe configuration information;
determining according to a preset correspondence, second subframe configuration corresponding to the second subframe configuration index; and
determining according to the second subframe configuration, the second subframe for receiving the common information on the second narrowband resource.

7. The user equipment according to claim 5, wherein the second subframe configuration information comprises one or more of the following content:
a subframe for the common information, a start subframe for the common information, a subframe period for the common information, a radio frame for the common information, a radio frame number for the common information, a radio frame period for the common information, a quantity of subframes occupied by the common information, a quantity of radio frames occupied by the common information, a quantity of symbols occupied by the common information, or a start symbol for the common information.

8. The user equipment according to claim 1, wherein the receiving the information only on the first narrowband resource in the first subframe comprises:
receiving the unicast control information only on the first narrowband resource in the first subframe; and
the following steps further comprises:
determining according to the unicast control information, a subframe for transmitting the unicast data information scheduled by using the unicast control information; and
receiving the unicast data information in the determined subframe for transmitting the unicast data information.

9. A base station, comprising:
a processor and a memory, wherein the memory stores an execution instruction that when executed by the processor configure the base station to perform steps comprising:
determining for a low-complexity user equipment, first subframe configuration information used to instruct to transmit information on a first narrowband resource, the first narrowband resource comprises a frequency resource that is capable to be supported or processed by the low-complexity user equipment;
determining according to the first subframe configuration information, a first subframe in which the low-complexity user equipment receives the information on the first narrowband resource; and
sending the information to the low-complexity user equipment on the first narrowband resource in the first subframe,
wherein the information comprises common information and the information does not comprise user-specific information, and the common information comprises one or more of: random access response information, or control information for scheduling the random access response information.

10. The base station according to claim 9, wherein the determining, for the user equipment, first subframe configuration information used to instruct to transmit information on a first narrowband resource comprises:
   determining the first subframe for the user equipment, wherein the first subframe is a subframe in which the user equipment receives the information on the first narrowband resource;
   determining according to a preset correspondence, a first subframe configuration index corresponding to first subframe configuration; and
   generating the first subframe configuration information, wherein the first subframe configuration information comprises the first subframe configuration index.

11. The base station according to claim 9, wherein the steps further comprises:
   sending, by the base station, the first subframe configuration information to the user equipment by using one or more of radio resource control signaling, Media Access Control signaling, or physical layer signaling.

12. An information receiving method performed by a low-complexity user equipment, comprising:
   obtaining first subframe configuration information used to instruct to receive information on a first narrowband resource, the first narrowband resource comprises a frequency resource that is capable to be supported or processed by the low-complexity user equipment;
   determining according to the first subframe configuration information, a first subframe for receiving the information on the first narrowband resource; and
   receiving the information in the first subframe only on the first narrowband resource,
   wherein the information comprises common information and the information does not comprise user-specific information, and the common information comprises one or more of: random access response information, or control information for scheduling the random access response information.

13. The method according to claim 1, wherein the obtaining first subframe configuration information used to instruct to receive information on a first subband resource comprises:
   obtaining the first subframe configuration information according to preconfiguration; or
   obtaining the first subframe configuration information by receiving one or more of radio resource control signaling, Media Access Control signaling, or physical layer signaling.

14. An information transmission method, comprising:
   determining, by a base station for a low-complexity user equipment, first subframe configuration information used to instruct to transmit information on a first narrowband resource, the first narrowband resource comprises a frequency resource that is capable to be supported or processed by the low-complexity user equipment;
   determining, by the base station according to the first subframe configuration information, a first subframe in which the low-complexity user equipment receives the information on the first narrowband resource; and
   sending, by the base station, the information to the low-complexity user equipment on the first narrowband resource in the first subframe,
   wherein the information comprises common information and the information does not comprise user-specific information, and the common information comprises one or more of: random access response information, or control information for scheduling the random access response information.

15. The method according to claim 3, wherein the method further comprises:
   sending, by the base station, the first subframe configuration information to the low-complexity user equipment by using one or more of radio resource control signaling, Media Access Control signaling, or physical layer signaling.

* * * * *